US012194744B2

(12) United States Patent
Tagawa et al.

(10) Patent No.: US 12,194,744 B2
(45) Date of Patent: Jan. 14, 2025

(54) LIQUID JET DISCHARGE DEVICE

(71) Applicants: National University Corporation Tokyo University of Agriculture & Technology, Tokyo (JP); Kishu Giken Kogyo Co., Ltd., Wakayama (JP)

(72) Inventors: Yoshiyuki Tagawa, Fuchu (JP); Masaaki Kurita, Wakayama (JP); Shinji Torii, Wakayama (JP)

(73) Assignees: NATIONAL UNIVERSITY CORPORATION TOKYO UNIVERSITY OF AGRICULTURE AND TECHNOLOGY, Tokyo (JP); KISHU GIKEN KOGYO CO., LTD., Wakayama (JP)

( * ) Notice: Subject to any disclaimer, the term of this patent is extended or adjusted under 35 U.S.C. 154(b) by 950 days.

(21) Appl. No.: 17/253,535

(22) PCT Filed: Jun. 20, 2019

(86) PCT No.: PCT/JP2019/024531
§ 371 (c)(1),
(2) Date: Dec. 17, 2020

(87) PCT Pub. No.: WO2019/244984
PCT Pub. Date: Dec. 26, 2019

(65) Prior Publication Data

US 2021/0138786 A1 May 13, 2021

(30) Foreign Application Priority Data

Jun. 22, 2018 (JP) ................................ 2018-119345

(51) Int. Cl.
*B05B 7/24* (2006.01)
*B41J 2/015* (2006.01)
*B41J 2/14* (2006.01)

(52) U.S. Cl.
CPC .................. *B41J 2/14* (2013.01); *B05B 7/24* (2013.01); *B41J 2/015* (2013.01)

(58) Field of Classification Search
CPC .. B41J 2/14; B41J 2/015; B41J 25/304; B05B 7/24; B05B 1/083
See application file for complete search history.

(56) References Cited

U.S. PATENT DOCUMENTS 7,584,903 B2 * 9/2009 Koerner ............... F04B 43/043 239/102.1
2008/0316279 A1 * 12/2008 Takemoto ................. B41J 2/14 347/65

(Continued)

FOREIGN PATENT DOCUMENTS

EP 3296026 A1 3/2018
JP H07-290698 A 11/1995

(Continued)

OTHER PUBLICATIONS

International Search Report issued in corresponding International Patent Application No. PCT/JP2019/024531 dated Aug. 6, 2019.

(Continued)

*Primary Examiner* — Qingzhang Zhou
*Assistant Examiner* — Joel Zhou
(74) *Attorney, Agent, or Firm* — Morgan, Lewis & Bockius LLP

(57) ABSTRACT

The present disclosure provides a composition with an ingredient derived from a turmeric.

7 Claims, 16 Drawing Sheets

(56) References Cited

U.S. PATENT DOCUMENTS

| | | | | |
|---|---|---|---|---|
| 2012/0285564 | A1* | 11/2012 | Airaksinen | G01F 11/021 137/565.01 |
| 2018/0133745 | A1* | 5/2018 | Tagawa | B41J 2/04 |

FOREIGN PATENT DOCUMENTS

| | | | |
|---|---|---|---|
| JP | H08-207277 | A | 8/1996 |
| WO | 2016/182081 | A1 | 11/2016 |

OTHER PUBLICATIONS

Extended European Search Report issued in corresponding European Patent Application No. 19822410.7 dated Sep. 16, 2021.

* cited by examiner

LIQUID JET DISCHARGE DEVICE

TECHNICAL FIELD

The present disclosure relates to a liquid jet discharge device.

BACKGROUND ART

Liquid jets have hitherto been utilized in various fields, such as ink jet printers, micromachine devices, and the like. The majority of discharge devices of such liquid jets are devices that discharge liquid jets with a diameter of about the internal diameter of a discharge tube or greater. For example, piezo ink jet and BUBBLEJET (registered trademark) methods employed in ink jet printers fall in this category, and are both methods that extrude a liquid from a discharge hole (nozzle). The diameter of discharged liquid droplets is thus the diameter of the discharge holes or greater.

In contrast thereto, when a large acceleration is imparted over a short period of time to a liquid surface with a concave surface profile in a discharge tube, a liquid jet as thin as about ⅕ the internal diameter of the discharge tube can be discharged from the discharge tube. If such thin liquid jets could be applied, then the problem of clogging, which is a problem in the extrusion methods of ink jet printers and the like, could be solved.

In consideration of this issue, International Publication (WO) No. 2016/182081 proposes technology in which a fine tube is disposed with one end inserted into liquid held inside a container, and a contact angle of the tube interior of the fine tube is an angle of less than 90°, such that the other end of the fine tube is outside the liquid. The difference between a liquid level inside the container at the exterior of the fine tube and the liquid level inside the fine tube enables the discharge velocity of a liquid jet discharged from a liquid surface in the fine tube to be regulated when a impulse force is imparted to the liquid inside the container in order to impart the liquid with an initial velocity.

This configuration enables a velocity increase ratio of the liquid jet discharge velocity relative to the initial velocity of the liquid inside the container to be increased, and thus enables discharge of high viscosity liquids was not possible using conventional ink jet methods.

SUMMARY OF INVENTION

In the prior technology described above, when the liquid level difference between the liquid surface in the container outside the fine tube and the liquid surface inside the fine tube is increased to increase the velocity increase ratio, the distance from the liquid surface inside the fine tube (liquid jet discharge position) to the end portion of the fine tube also increases. Accordingly, even a small amount of misalignment in the discharge direction of the liquid jet could cause the discharged liquid to adhere to the inner face of the fine tube.

In consideration of the above circumstances, an object of the present disclosure is to provide a liquid jet discharge device capable of discharging a high viscosity liquid while also being capable of suppressing adhesion of the liquid to a nozzle.

In order to achieve the above object, a liquid jet discharge device according to a first aspect includes an ejection section, a pressure generation section, and an impulse force impartation means. The ejection section is open at both end portions and internally houses a liquid such that a contact angle between the liquid and at least an inner face of the ejection section is less than 90°. The pressure generation section is in communication with one end portion of the ejection section, has a cross-sectional area larger than a cross-sectional area of the ejection section, has a length in a discharge direction of a liquid jet that is longer than a length in the discharge direction from the one end portion of the ejection section to a surface of the liquid, and houses the liquid at least at a bottom face side onto which the one end portion opens. The impulse force impartation means is configured to impart an impulse force to the pressure generation section.

In this liquid jet discharge device, the one end portion of the ejection section that is open at both end portions is in communication with the bottom face of the pressure generation section. The liquid is housed at least at the bottom face side of the pressure generation section and enters into the ejection section, such that the liquid surface is formed by surface tension inside the ejection section.

Since the contact angle between the liquid and the inner face of the ejection section is less than 90°, the liquid surface inside the ejection section forms a concave surface profile that is recessed toward the opposite side to the bottom face side of the pressure generation section. When the impulse force is imparted to the pressure generation section from the impulse force impartation means while in this state, the flow at the concave surface shaped liquid surface inside the ejection section is constricted, such that a liquid jet that is longer and thinner than the opening in the ejection section is discharged from a central portion of the liquid surface.

Note that the cross-sectional area of the pressure generation section is larger than the cross-sectional area of the ejection section, and that the liquid jet discharge direction length (referred to hereafter as the "discharge direction length") of the pressure generation section is longer than the discharge direction length from the one end portion (a pressure generation section-side end portion) of the ejection section to the liquid surface. This enables a velocity of the liquid that has entered the ejection section and formed the liquid surface (referred to hereafter as the "ejection section liquid velocity") to be made higher than a velocity imparted to the liquid housed in the pressure generation section from the impulse force impartation means (referred to hereafter as the "pressure generation section liquid velocity"). Namely, a velocity increase ratio of the ejection section liquid velocity (liquid jet discharge velocity) relative to the pressure generation section liquid velocity can be increased.

In particular, the velocity increase ratio can be increased by increasing the ratio of the discharge direction length of the pressure generation section relative to the discharge direction length from the one end portion of the ejection section to the liquid surface.

Thus, the velocity increase ratio of the ejection section liquid velocity (liquid jet discharge velocity) relative to the pressure generation section liquid velocity can be increased by increasing the discharge direction length of the pressure generation section, while keeping the discharge direction length of the ejection section short. This enables the discharge velocity of the liquid jet to be made high velocity, enabling a high viscosity liquid to be discharged.

Since the discharge direction length of the ejection section is kept short, the discharged liquid can be prevented or suppressed from adhering to the inner face of the ejection section, even if the discharge direction of the liquid jet is slightly misaligned.

Namely, high viscosity liquid can be discharged, and the liquid can be prevented or suppressed from adhering to the inner face of the ejection section.

A liquid jet discharge device according to a second aspect is the liquid jet discharge device according to the first aspect, wherein the one end portion of the ejection section may be aligned with the bottom face.

In this liquid jet discharge device, the one end portion of the ejection section that opens onto the bottom face side of the pressure generation section is aligned with the bottom face. Namely, the ejection section opens onto the bottom face of the pressure generation section, and does not project into the pressure generation section from the bottom face. In cases in which the one end of the ejection section projects from the bottom face into the pressure generation section, pressure loss is increased when the liquid held at the bottom face side of the pressure generation section moves into the ejection section. However, in the second aspect, the one end portion of the ejection section and the bottom face of the pressure generation section are aligned with each other, namely the ejection section does not project out from the bottom face of the pressure generation section, such that pressure loss is suppressed when the liquid at the bottom face side of the pressure generation section moves into the ejection section. This enables the velocity increase ratio of the ejection section liquid velocity (liquid jet discharge velocity) relative to the pressure generation section liquid velocity to be increased.

A liquid jet discharge device according to a third aspect is the liquid jet discharge device according to the second aspect, wherein a tapered face inclined toward the bottom face may be formed in the one end portion side of the ejection section.

This liquid jet discharge device is a liquid jet discharge device in which the one end of the ejection section opens onto the bottom face of the pressure generation section, the tapered face inclined toward the bottom face is formed at the one end side of the ejection section. Thus, pressure loss when the liquid flows into the ejection section from the bottom face side of the pressure generation section is further suppressed.

This enables the velocity increase ratio of the ejection section liquid velocity (liquid jet discharge velocity) relative to the pressure generation section liquid velocity to be increased.

A liquid jet discharge device according to a fourth aspect is the liquid jet discharge device according to any one of the first aspect to the third aspect, wherein the one end portion of the ejection section may open onto a center of the bottom face of the pressure generation section.

In this liquid jet discharge device, the one end portion of the ejection section opens onto the center of the bottom face of the pressure generation section, such that liquid pressure loss is suppressed when the liquid flowing along the bottom face of the pressure generation section moves so as to flow into the ejection section. This enables the velocity increase ratio of the ejection section liquid velocity (liquid jet discharge velocity) relative to the pressure generation section liquid velocity to be increased.

A liquid jet discharge device according to a fifth aspect is the liquid jet discharge device according to any one of the first aspect to the fourth aspect, wherein the liquid may be housed on the bottom face side of the pressure generation section, and a pressure generation medium having an acoustic impedance of from 1 to 1.5 times an acoustic impedance of the liquid may be housed on an opposite side to the bottom face side without mixing or chemically reacting with the liquid.

In this liquid jet discharge device, the liquid is housed on the bottom face side inside the pressure generation section, and the pressure generation medium that is different to the liquid is housed on the opposite side to the bottom face side. The acoustic impedance of the pressure generation medium is from 1 to 1.5 times the acoustic impedance of the liquid. Thus, when an impulse force is imparted to the pressure generation section from the impulse force impartation means, a fall in the energy transmission rate at an interface between the pressure generation medium and the liquid is suppressed, and the liquid in the ejection section is discharged as a liquid jet.

Note that by imparting the impulse force to the pressure generation section in this manner, the pressure generation medium is also used as a medium that generates pressure in the pressure generation section, thereby enabling the liquid housed in the pressure generation section to be economized.

Note that since the pressure generation medium does not mix or chemically react with the liquid, there is no concern regarding a reduction in the quality of the discharged liquid jet (liquid).

A liquid jet discharge device according to a sixth aspect is the liquid jet discharge device according to any one of the first aspect to the fifth aspect, which may further include a replenishment device. The replenishment device includes a replenishment section inside which the liquid is held, and a liquid supply path that is in communication with a portion of the replenishment section holding the liquid and with a portion of the pressure generation section holding the liquid.

In this liquid jet discharge device, even when the liquid jet is discharged from the ejection section and the liquid in the pressure generation section decreases by a proportionate amount, the liquid in the pressure generation section can be replenished from the replenishment section of the replenishment device through the liquid supply path. Namely, the liquid jet can be continually discharged.

A liquid jet discharge device according to a seventh aspect is the liquid jet discharge device according to the sixth aspect, wherein another end portion of the ejection section may open downward in the liquid jet discharge device. The replenishment device may be configured to supply the liquid to the pressure generation section by either an action of a head pressure of the liquid held in the replenishment section and an action of surface tension of the liquid, or by the action of the surface tension of the liquid alone.

In this liquid jet discharge device, the other end portion of the ejection section opens downward, namely the liquid jet discharge device discharges a downward-facing liquid jet. In this liquid jet discharge device, the liquid held in the replenishment section of the replenishment device can be supplied to pressure generation section by either the head pressure action of the liquid and the surface tension action of the liquid, or by the surface tension action of the liquid alone. Namely, the liquid can be supplied into the pressure generation section from the replenishment device without using a mechanical action or the like, enabling the liquid jet to be continually discharged from the ejection section.

The liquid jet discharge devices according to the first to the fourth aspects enable a liquid jet with a high velocity increase ratio to be discharged, while preventing or suppressing clogging.

The liquid jet discharge device according to the fifth aspect enables the amount of liquid used in the pressure generation section to be suppressed.

The liquid jet discharge devices according to the sixth and seventh aspects enable the liquid jet to be continually discharged.

DESCRIPTION OF EMBODIMENTS

Detailed explanation follows regarding exemplary embodiments of the present disclosure, with reference to the drawings.

First Exemplary Embodiment

Device Configuration

Figure 1:
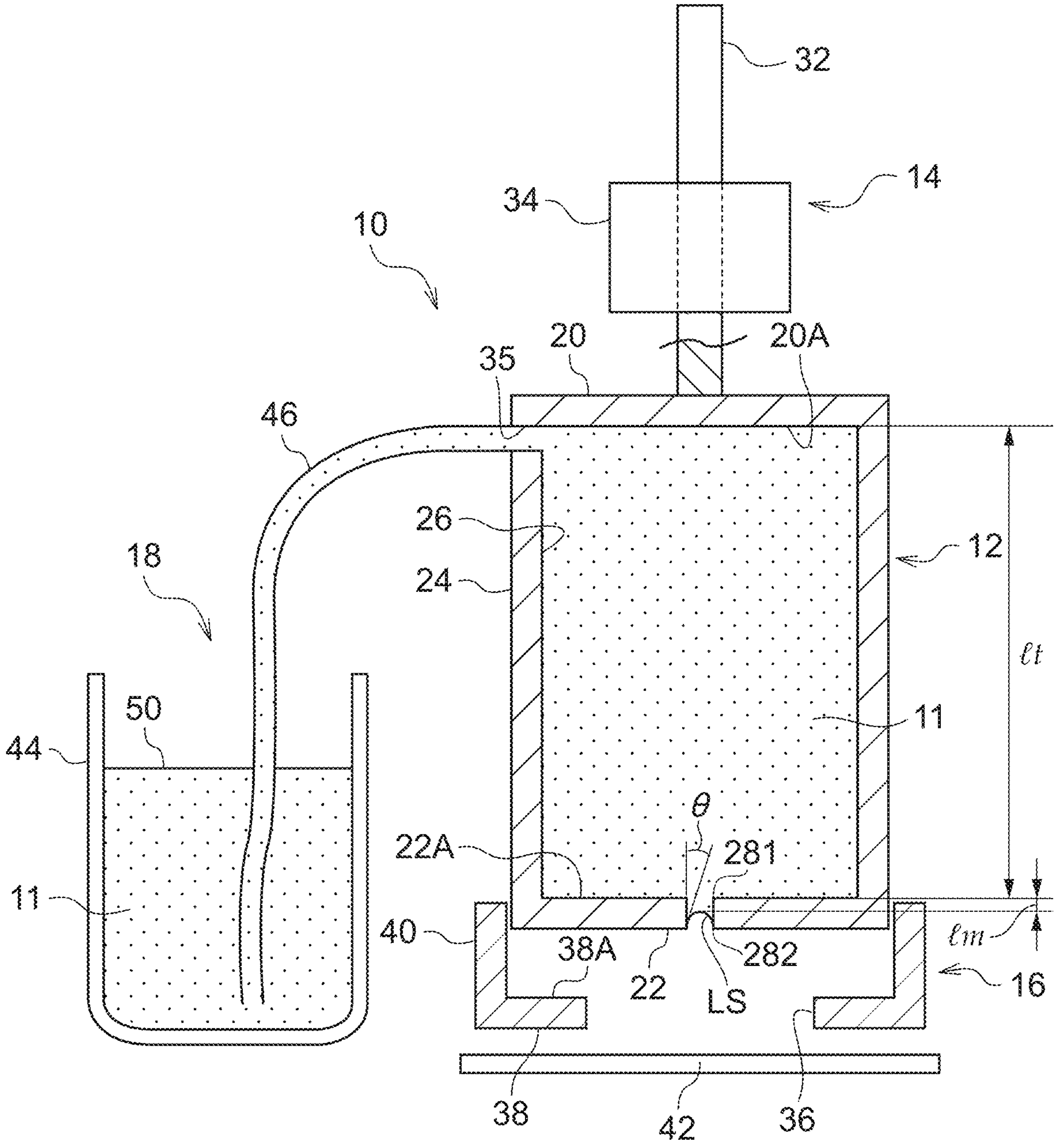
FIG. 1 is a schematic configuration diagram of a liquid jet discharge device according to a first exemplary embodiment.

First, explanation follows regarding a liquid jet discharge device 10 according to a first exemplary embodiment, with reference to FIG. 1. The liquid jet discharge device 10 includes a container 12 inside which an ink 11 serving as an example of a liquid is filled (housed) and that is formed with a nozzle 28, described later, at a lower end portion. The liquid jet discharge device 10 also includes a moving mechanism 14 that moves the container 12 in an up-down direction, a stopper 16 that is abutted by the container 12 when moving downward so as to stop the container 12, and a replenishment device 18 that supplies the ink 11 into the container 12.

The container 12 is formed in a circular cylinder shape, and includes an upper wall 20, a bottom wall 22, and a peripheral wall 24 running around so as to connect the upper wall 20 and the bottom wall 22.

A section of the container 12 enclosed by the upper wall 20, the bottom wall 22, and the peripheral wall 24 configures a pressure generation chamber 26 in which the ink 11 is housed. The pressure generation chamber 26 corresponds to a "pressure generation section".

The nozzle 28 is formed penetrating a central portion of the bottom wall 22 from top to bottom. The nozzle 28 corresponds to an "ejection section".

As illustrated in FIG. 1, the nozzle 28 is formed with a a cross-sectional area in an orthogonal direction to the axial (up-down) direction of the nozzle 28 (simply "cross sectional area" thereafter that is smaller than the area of a portion (referred to hereafter as the "bottom face 22A") of the bottom wall 22 configuring the pressure generation chamber 26 (i.e. smaller than the cross-sectional area of the pressure generation chamber 26).

Moreover, an axial direction length ($l_t$, described later) of the pressure generation chamber 26 is set longer than an axial direction length ($l_m$, described later) from a pressure generation chamber-side end portion of the nozzle 28 to a liquid surface (such that $l_t/l_m>1$). The pressure generation chamber 26 and the nozzle 28 are disposed coaxially with each other. Note that this axial direction corresponds to a "liquid jet discharge direction".

The pressure generation chamber 26 is filled with the ink 11. A contact angle θ between the ink 11 and an inner peripheral face of the nozzle 28 is set to less than 90°. Accordingly, the ink 11 that has entered the nozzle 28 from the pressure generation chamber 26 forms an upwardly convex (downwardly concave) meniscus (liquid surface LS) inside the nozzle 28.

The moving mechanism 14 is provided above the container 12 in order to move the container 12 up and down. The moving mechanism 14 includes a rod 32 extending in an upward direction from a central portion of the upper wall 20 of the container 12, and a solenoid 34 installed above the container 12 such that the rod 32 passes through the solenoid 34. Namely, the rod 32 is moved up and down, thereby moving the container 12 up and down, by driving the solenoid 34. Note that the container 12 is normally (except when discharging a liquid jet) positioned separated from and at a specific distance above the stopper 16.

An opening 35 is formed in an upper portion of the peripheral wall 24 of the container 12 so as to place the interior and exterior of the pressure generation chamber 26 in communication with each other.

The stopper 16 is installed below the bottom wall 22 of the container 12.

The stopper 16 includes a circular plate portion 38 and a peripheral wall 40. The circular plate portion 38 has a donut shape centrally formed with a hole 36 that is larger than the cross-sectional area of the nozzle 28. The peripheral wall 40 is disposed coaxially with the container 12, and has a larger internal diameter than the external diameter of the container 12 (peripheral wall 24).

A spacing between a lower end of the container 12 and an abutting face 38A configuring an upper face of the circular plate portion 38 of the stopper 16 is set smaller than a stroke of the rod 32 when the solenoid 34 is driven. Accordingly, when the solenoid 34 is driven to lower the container 12, the bottom wall 22 of the container 12 abuts the abutting face 38A of the circular plate portion 38 of the stopper 16.

The moving mechanism 14 and the stopper 16 correspond to an "impulse force impartation means".

Paper 42, serving as a discharge target, is loaded below the circular plate portion 38 of the stopper 16. Configuration is made such that a liquid jet MJ, described later, discharged from the nozzle 28, lands on the paper 42. The paper 42 is fed by a non-illustrated paper feed mechanism.

As illustrated in FIG. 1, the replenishment device 18 includes a replenishment tank 44 serving as a replenishment section disposed at a side of the container 12, and a replenishment tube 46 serving as a liquid supply path that places the replenishment tank 44 in communication with the pressure generation chamber 26.

The replenishment tank 44 is an open-topped tank inside which the ink 11 is held. A liquid surface 50 of the ink 11 is maintained so as to be higher than the bottom face 22A of the pressure generation chamber 26 by a non-illustrated regulating means. For example, a mechanism to raise the replenishment tank 44 as the ink 11 is supplied may be provided as the regulating means.

The replenishment tube 46 is flexible, and has one end connected to the opening 35 formed in the peripheral wall 24 of the container 12, and has another end disposed inside the ink 11 held in the replenishment tank 44.

Operation

Explanation follows regarding operation of the liquid jet discharge device 10 configured in the above manner.

First, the solenoid 34 is driven to lower the rod 32 at a predetermined speed. Since the spacing (up-down direction length) between the bottom wall 22 of the container 12 and the abutting face 38A of the stopper 16 is set shorter than the stroke of the rod 32, the bottom wall 22 of the container 12 impacts the abutting face 38A of the stopper 16.

Figure 2:
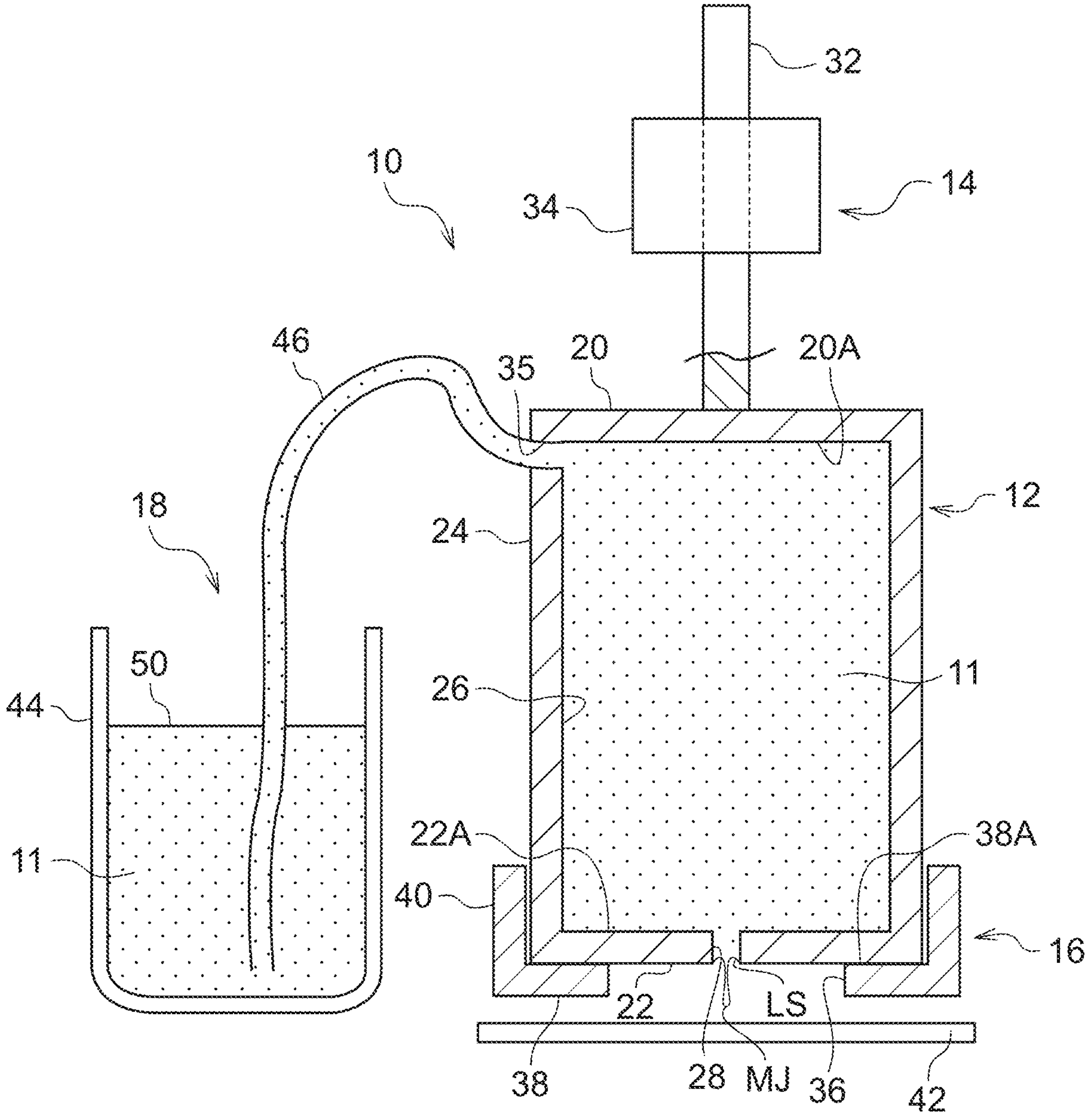
FIG. 2 is a schematic configuration diagram of a liquid jet discharge device according to the first exemplary embodiment, to explain a state after a container has impacted a stopper.

An impulse force acts on the container 12 from this impact. When this occurs, as illustrated in FIG. 2, the meniscus (liquid surface LS) that was formed with a concave surface profile due to the contact angle θ of the ink 11 being less than 90° adopts a horizontal surface profile inside the nozzle 28, and a liquid jet MJ that is thinner than the nozzle 28 is ejected (discharged) from a central portion of the meniscus.

In the liquid jet MJ, due to this impulse force there is a large velocity increase ratio ($=U_0'/U_0$) of an initial velocity $U_0'$ of the ink 11 inside the nozzle 28 relative to an initial velocity $U_0$ of the ink 11 inside the pressure generation chamber 26, resulting in a large velocity increase ratio β ($=V_{jet}/U_0$) of a jet velocity $V_{jet}$, described later.

Thus when a given amount of energy is imparted, a high proportion of energy from the ink 11 can be concentrated in the liquid jet MJ due to achieving a higher velocity increase ratio β (enabling the liquid jet MJ to be discharged extremely fast). This enables even ink 11 with a high viscosity, which would hitherto not be possible to discharge using a liquid jet with a low velocity increase ratio, to be discharged when a given amount of energy is imparted to the ink 11 of the liquid jet discharge device 10.

Parameters

Parameters employed to explain an analysis model for analyzing the liquid jet MJ discharged by the liquid jet discharge device 10 are described below.

An analysis model according to an Example is an analysis model of cases in which the liquid jet MJ is discharged using the liquid jet discharge device 10.

Figure 3:
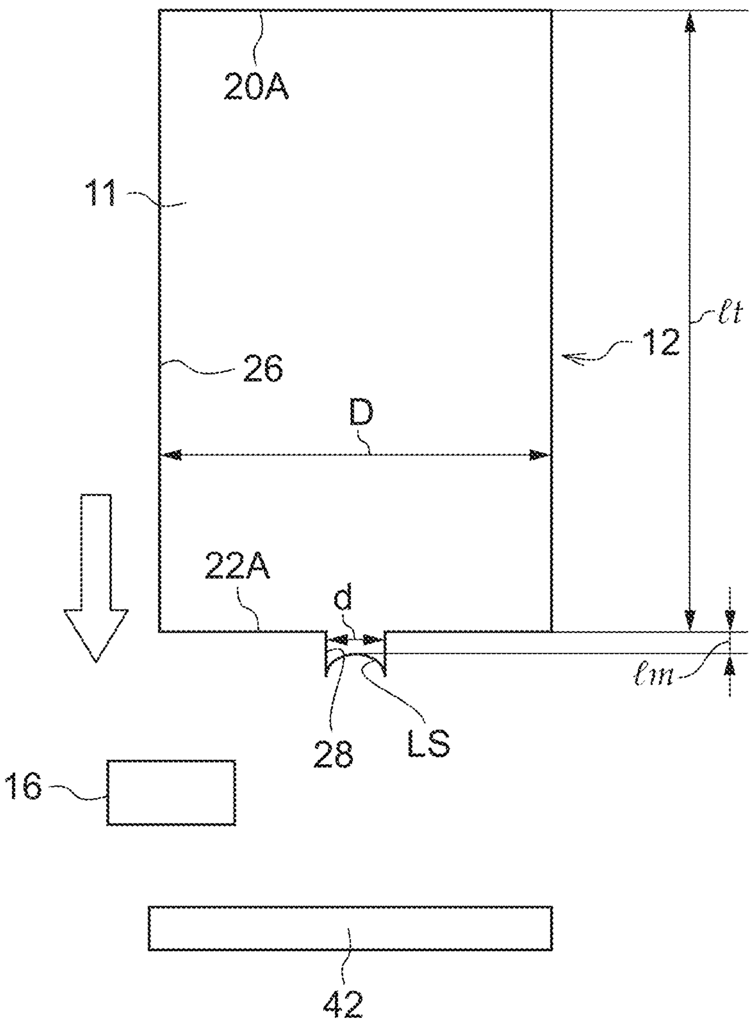
FIG. 3 is an outline diagram of a liquid jet discharge device according to the first exemplary embodiment, to explain a state before a container has impacted a stopper.
Figure 4:
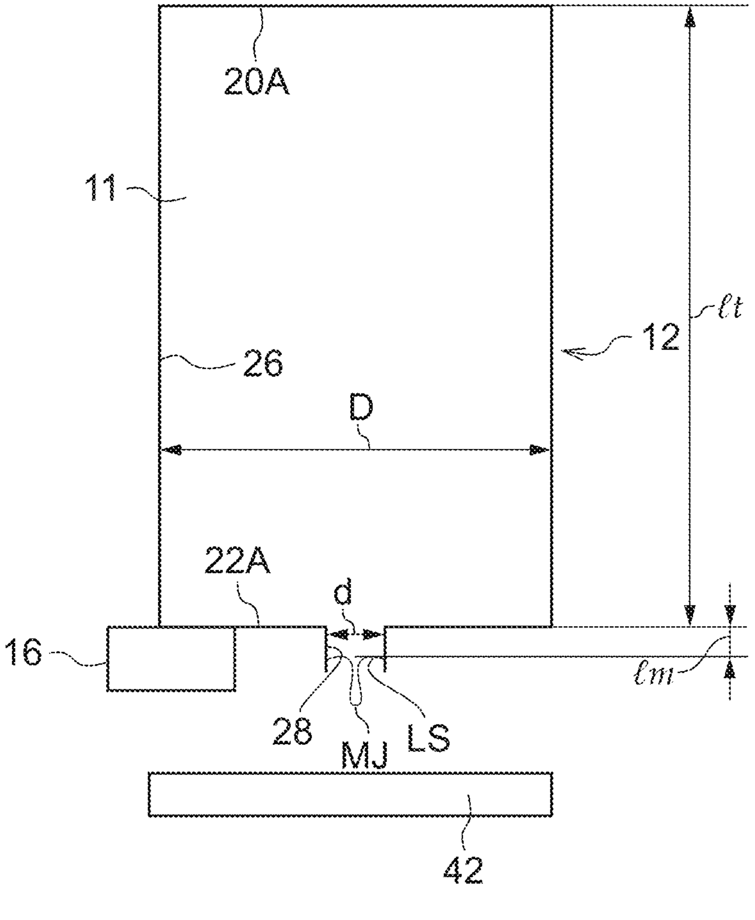
FIG. 4 is an outline diagram of a liquid jet discharge device according to the first exemplary embodiment, to explain a state after a container has impacted a stopper.

The parameters are as set out below (see FIG. 3 and FIG. 4).

- $l_t$: an axial direction distance (first length) from the bottom face 22A to an upper face 20A of the pressure generation chamber 26 (mm).
- $l_m$: an axial direction distance (second length) from a pressure generation chamber-side end portion of the nozzle 28 (the bottom face 22A of the pressure generation chamber 26) to a meniscus formation position of the liquid surface LS inside the nozzle 28 (mm).
- d: nozzle 28 internal diameter (mm).
- ν: kinetic viscosity of the ink 11 ($mm^2/s$) (in the present specification, the "viscosity" refers to the kinetic viscosity).

Analysis Model

First, explanation follows regarding a physical model relating to the jet velocity $V_{jet}$ of the liquid jet MJ generated by the liquid jet discharge device 10.

In cases in which the ink 11 inside the container 12 is suddenly accelerated by impulse force, the velocity of the ink 11 during the sudden change, and the velocity in the vicinity of a wall configuring the pressure generation chamber 26, are not large. Thus, terms in Navier-Stokes equations that only include velocity and spatial differentials can be ignored since they are sufficiently small compared to other terms. Doing so, the Navier-Stokes equations give an initial velocity $U_0$ imparted to the ink 11 inside the pressure generation chamber 26 as below, wherein ρ is density.

$$U_0 = -\frac{1}{\rho}\frac{\partial \Pi}{\partial z} \tag{1}$$

Wherein Π is the pressure impulse, and z is tube axial direction distance. The pressure impulse Π is expressed by the following equation, wherein p is pressure, and τ is impulse force duration.

$$\Pi = \int_0^{\tau} p\,dt \tag{2}$$

Figure 5:
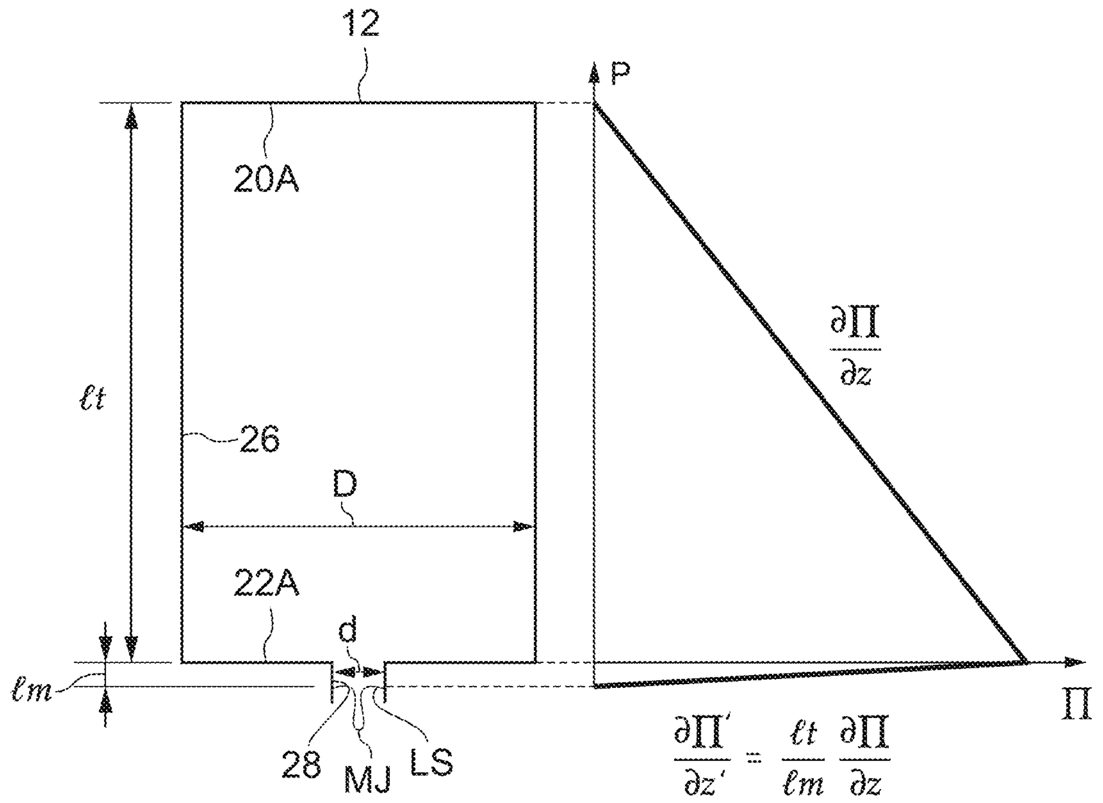
FIG. 5 is an outline diagram illustrating discharge of a liquid jet by a liquid jet discharge device according to the first exemplary embodiment alongside a pressure impulse gradient.

When the bottom wall 22 of the container 12 impacts the abutting face 38A of the stopper 16, as illustrated in FIG. 5, a pressure impulse gradient ∂Π/∂z arises in the container 12 (pressure generation chamber 26). The pressure impulse gradient ∂Π/∂z is constant, irrespective of the tube axial direction distance z.

The pressure impulse generated by imparting the impulse force to the container 12 increases on a constant gradient (first gradient) from the upper face 20A to the bottom face 22A of the pressure generation chamber 26, and decreases on a constant gradient (second gradient) toward the meniscus surface (liquid surface LS) inside the nozzle 28 (so as to become 0 at the position of the meniscus) (see FIG. 5).

The pressure impulse gradient $\partial\Pi/\partial z$ in the pressure generation chamber 26 of the container 12 changes to a pressure impulse gradient $\partial\Pi'/\partial z'$ inside the nozzle at the upper end of the nozzle 28, namely at a boundary with the bottom face 22A of the pressure generation chamber 26.

Due to the geometric relationship illustrated in FIG. 5, when employing the pressure impulse gradient $\partial\Pi/\partial z$ of the pressure generation chamber 26, the first length $l_t$, and the second length $l_m$, the pressure impulse gradient $\partial\Pi'/\partial z'$ of the ink 11 inside the nozzle becomes:

$$\frac{\partial \prod'}{\partial z'} = \frac{l_t}{l_m}\frac{\partial \prod}{\partial z} \quad (3)$$

Similarly to in Equation (1), the initial velocity $U_0'$ imparted to the ink 11 inside the nozzle 28 is:

$$U_0' = -\frac{1}{\rho}\frac{\partial \prod'}{\partial z'} \quad (4)$$

According to Equation (1), Equation (3), and Equation (4), the initial velocity $U_0'$ imparted to the ink 11 inside the nozzle 28 is:

$$U_0' = -\frac{1}{\rho}\frac{l_t}{l_m}\frac{\partial \prod}{\partial z} = \frac{l_t}{l_m}U_0 \quad (5)$$

According to Equation (5), the initial velocity $U_0'$ imparted to the ink 11 inside the nozzle 28 is $(l_t/l_m)$ times greater than the initial velocity $U_0$ imparted to the ink 11 inside the pressure generation chamber 26. The jet velocity (liquid jet MJ discharge velocity) $V_{jet}$ generated in the nozzle 28 is:

$$V_{jet} = \beta U_0' = \beta\frac{l_t}{l_m}U_0 \quad (6)$$

proportionally to the initial velocity $U_0'$ of the ink 11 inside a fine tube.

The pressure generation chamber 26 that has a larger cross-sectional area than the cross-sectional area of the nozzle 28 (the internal diameter D is larger than the internal diameter d of the nozzle 28 (D/d>1)) and the first length $l_t$ that is longer than the second length $l_m$ ($l_t/l_m>1$) is thus provided inside the container 12 above the nozzle 28. This enables the initial velocity $U_0'$ imparted to the ink 11 inside the nozzle 28 to be sped up in comparison to the initial velocity $U_0$ inside the pressure generation chamber 26. This enables the jet velocity $V_{jet}$ generated by the nozzle 28 to likewise be sped up.

Namely, the velocity increase ratio β of the jet velocity $V_{jet}$ can be increased by increasing the first length $l_t$, or by reducing the second length $l_m$.

Numerical Calculations

The following numerical calculations were performed to confirm the operation described above and interpretations based on the analysis model.

A liquid jet discharge device 10 according to an Example with the same configuration as that illustrated in FIG. 1 was employed.

Numerical values were set as follows:

first length $l_t$=40 mm second length $l_m$=1.5 mm internal diameter D of pressure generation chamber=10 mm internal diameter d of nozzle=2 mm initial velocity $U_0$ of ink in pressure generation chamber=1.25 m/s kinetic viscosity ν of ink 11: 100 $mm^2$/s.

FIG. 6 to FIG. 10 illustrate logical values and numerical calculation results under the above conditions when varying any one of the first length $l_t$, the second length $l_m$, the internal diameter d of the nozzle, or the kinetic viscosity ν of the ink 11. Note that the logical values are indicated for the analysis model (see FIG. 5).

1. When Varying First Length $l_t$

Figure 6:
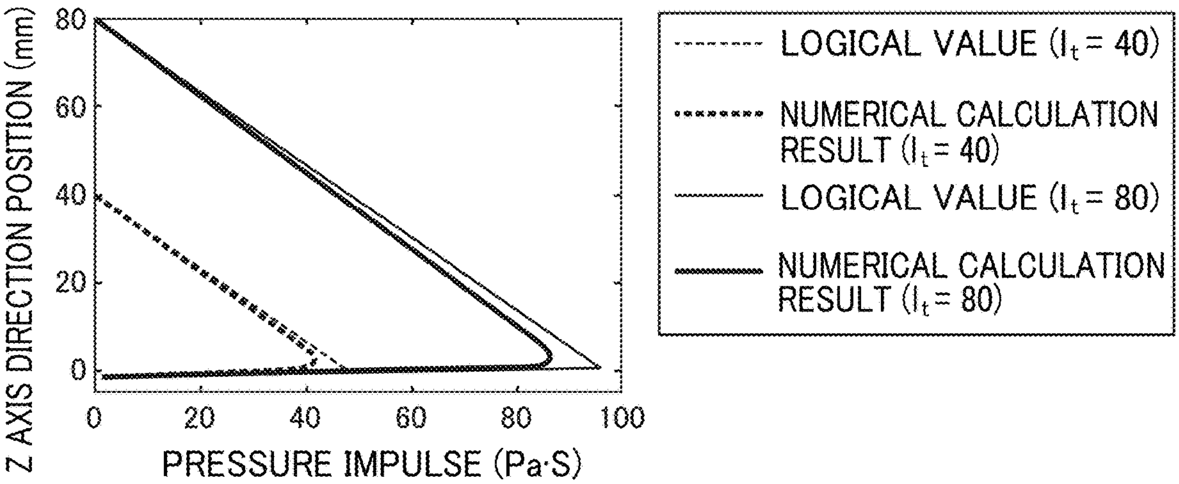
FIG. 6 is a graph illustrating logical values and numerical calculation results for a relationship between a pressure impulse and a Z axis direction distance when varying the axial direction length of a pressure generation chamber of a liquid jet discharge device according to the first exemplary embodiment.

FIG. 6 illustrates logical values and numerical calculation results for the distribution of the pressure impulse imparted to the ink in the container when varying the first length $l_t$ to either 40 mm or 80 mm. The bold lines represent the numerical calculation results, and the fine lines represent the logical values.

As can be seen from FIG. 6, even in cases in which the first length $l_t$ has been varied to 40 mm or 80 mm, the numerical calculation results are closely aligned with the logical values, with the exception of in the vicinity of the bottom face 22A of the container 12 (the connection location between the pressure generation chamber 26 and the nozzle 28). Moreover, it is confirmed that increasing the first length $l_t$ causes the pressure impulse gradient to increase as predicted by the logic.

When the logically derived initial velocity $U_0'$ imparted to the ink 11 inside the nozzle 28 is compared against the numerical calculation results for the initial velocity $U_0'$ imparted to the ink 11 inside the nozzle 28:

for the case in which $l_t$ is 40 mm, the logical value is 33.3 m/s whereas the numerical calculation result is 21.6 m/s; and for the case in which $l_t$ is 80 mm, the logical value is 66.7 m/s whereas the numerical calculation result is 44.1 m/s.

2. When Varying Second Length $l_m$

Figure 7:
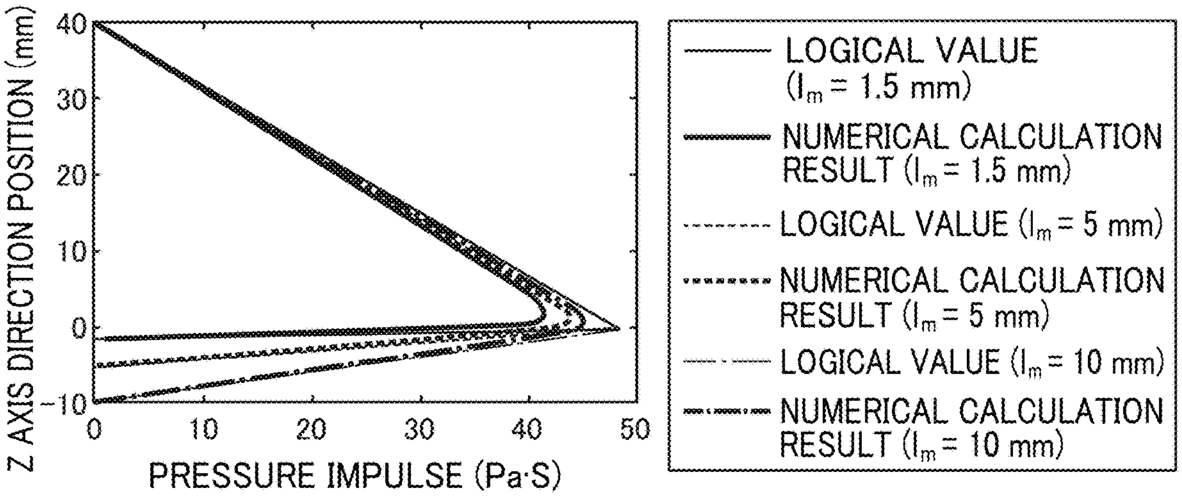
FIG. 7 is a graph illustrating logical values and numerical calculation results for a relationship between a pressure impulse and a Z axis direction distance when varying the axial direction length of a nozzle of a liquid jet discharge device according to the first exemplary embodiment.

FIG. 7 illustrates logical values and numerical calculation results for the distribution of the pressure impulse imparted to the ink in the container when varying the second length $l_m$ to 1.5 mm, 5 mm, and 10 mm. The bold lines represent the numerical calculation results, and the fine lines represent the logical values.

As can be seen from FIG. 7, even in cases in which the second length $l_m$ has been varied to 1.5 mm, 5 mm, and 10 mm, the numerical calculation results are closely aligned with the logical values, with the exception of in the vicinity of bottom face 22A of the container 12 (the connection location between the pressure generation chamber 26 and the nozzle 28). Moreover, it is confirmed that increasing the second length $l_m$ causes the pressure impulse gradient to decrease as predicted by the logic.

When the logically derived initial velocity $U_0'$ imparted to the ink 11 inside the nozzle 28 is compared against the numerical calculation results for the initial velocity $U_0'$ imparted to the ink 11 inside the nozzle 28:

for the case in which $l_m$ is 1.5 mm, the logical value is 33.3 m/s whereas the numerical calculation result is 21.6 m/s;

for the case in which $l_m$ is 5 mm, the logical value is 10 m/s whereas the numerical calculation result is 8.4 m/s; and for the case in which $l_m$ is 10 mm, the logical value is 5 m/s whereas the numerical calculation result is 4.5 m/s.

Figure 8:
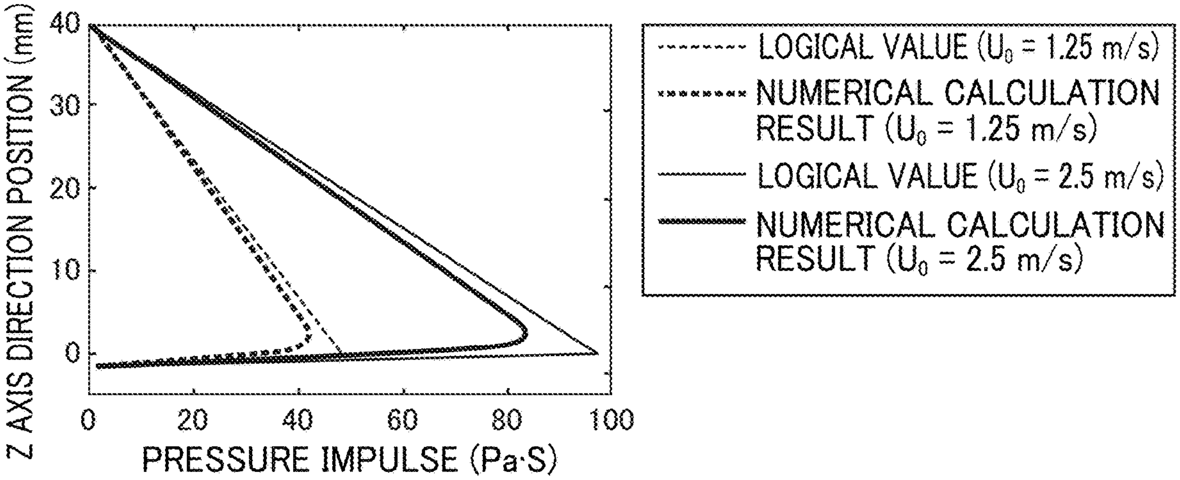
FIG. 8 is a graph illustrating logical values and numerical calculation results for a relationship between a pressure impulse and a Z axis direction distance when varying the initial velocity of ink in a pressure generation chamber of a liquid jet discharge device according to the first exemplary embodiment.

3. When Varying Initial Velocity $U_0$ of Ink Inside Pressure Generation Chamber FIG. 8 illustrates logical values and numerical calculation results for the distribution of the pressure impulse imparted to the ink inside the container when varying the initial velocity $U_0$ of the ink inside the pressure generation chamber to either 1.25 m/s or 2.5 m/s. The bold lines represent the numerical calculation results, and the fine lines represent the logical values.

As can be seen from FIG. 8, even in cases in which the initial velocity $U_0$ of the ink inside the pressure generation chamber has been varied to 1.25 m/s or 2.5 m/s, the numerical calculation results are almost aligned with the logical values, with the exception of in the vicinity of the bottom face 22A of the container 12 (the connection location between the pressure generation chamber 26 and the nozzle 28). Moreover, it is confirmed that increasing the initial velocity $U_0$ of the ink inside the pressure generation chamber causes the pressure impulse gradient to increase as predicted by the logic.

When the logically derived initial velocity $U_0'$ imparted to the ink 11 inside the nozzle 28 is compared against the numerical calculation results for the initial velocity $U_0'$ imparted to the ink 11 inside the nozzle 28:

for the case in which $U_0$ is 1.25 m/s, the logical value is 33.3 m/s whereas the numerical calculation result is 21.6 m/s; and for the case in which $U_0$ is 2.5 m/s, the logical value is 66.7 m/s whereas the numerical calculation result is 43.8 m/s.

4. When Varying Internal Diameter d of Nozzle

Figure 9:
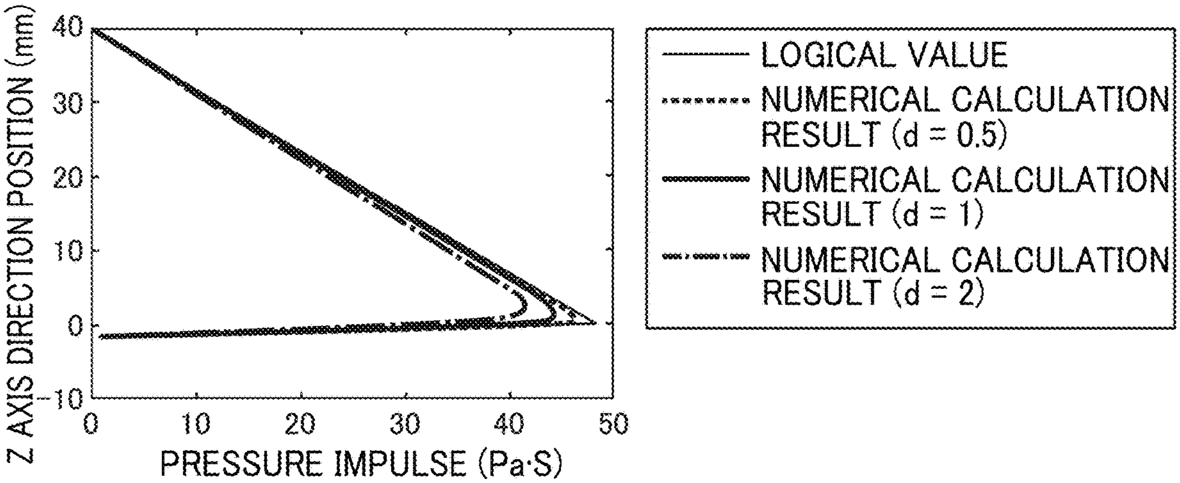
FIG. 9 is a graph illustrating logical values and numerical calculation results for a relationship between a pressure impulse and a Z axis direction distance when varying the internal diameter of a nozzle of a liquid jet discharge device according to the first exemplary embodiment.

FIG. 9 illustrates logical values and numerical calculation results for the distribution of the pressure impulse imparted to the ink inside the container when varying the internal diameter d of the nozzle to 0.5 mm, 1 mm, and 2 mm. The bold lines represent the numerical calculation results, and the fine line represents the logical value.

Since the logic assumes the internal diameter d of the nozzle to be small enough to ignore, the pressure impulse gradient inside the nozzle may be expected to deviate from the logical values as the internal diameter d of the nozzle becomes larger.

As illustrated in FIG. 9, in the cases in which the internal diameter d of the nozzle was varied to 0.5 mm, 1 mm, and 2 mm, deviation from the logical values is confirmed as the internal diameter d of the nozzle increased in size.

When the logically derived initial velocity $U_0'$ imparted to the ink 11 inside the nozzle 28 is compared against the numerical calculation results for the initial velocity $U_0'$ imparted to the ink 11 inside the nozzle 28:

for the case in which d is 0.5 mm, the logical value is 33.3 m/s whereas the numerical calculation result is 29.3 m/s;

for the case in which d is 1.0 mm, the logical value is 33.3 m/s whereas the numerical calculation result is 26.4 m/s; and for the case in which d is 1.5 mm, the logical value is 33.3 m/s whereas the numerical calculation result is 21.6 m/s.

5. When Varying Kinetic Viscosity ν of Ink

Figure 10:
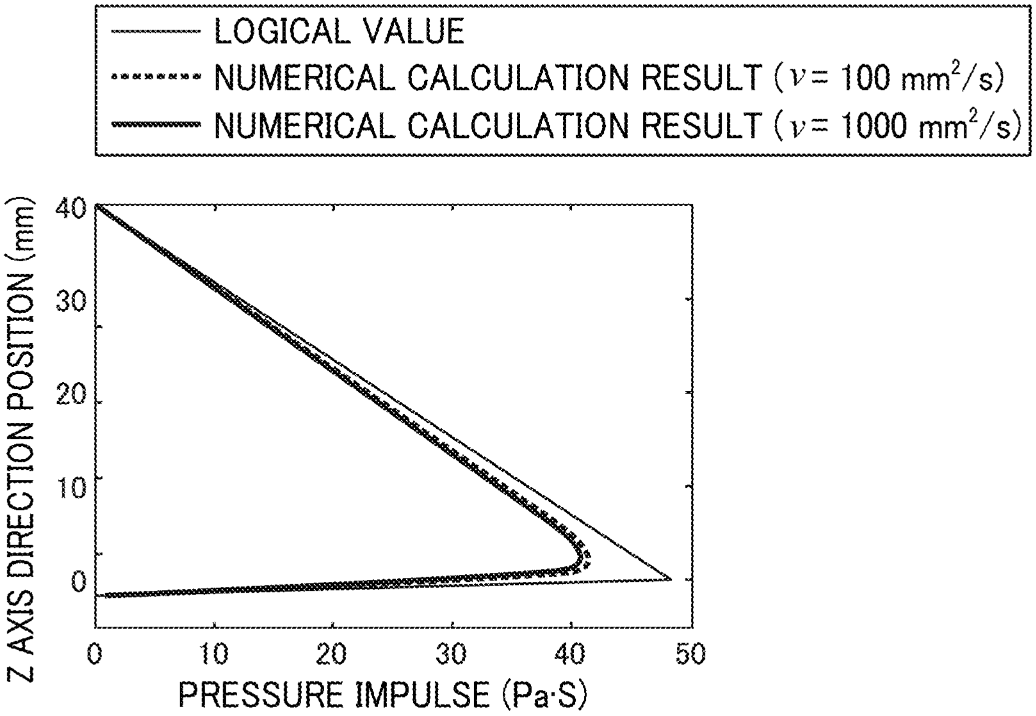
FIG. 10 is a graph illustrating logical values and numerical calculation results for a relationship between a pressure impulse and a Z axis direction distance when varying the kinetic viscosity of ink in a liquid jet discharge device according to the first exemplary embodiment.

FIG. 10 illustrates logical values and numerical calculation results for the distribution of the pressure impulse imparted to the ink inside the container when varying the kinetic viscosity ν of the ink to either 100 $mm^2/s$ or 1000 $mm^2/s$. The bold lines represent the numerical calculation results, and the fine line represents the logical value.

Since the logic assumes the kinetic viscosity of the ink to be ignorable, the pressure impulse gradient in the nozzle may be expected to deviate from the logical values as the kinetic viscosity ν of the ink becomes larger.

As illustrated in FIG. 10, in the cases in which the kinetic viscosity ν of the ink was varied to either 100 $mm^2/s$ or 1000 $mm^2/s$, some slight deviation from the logical value is confirmed as the kinetic viscosity of the ink increased.

When the logically derived initial velocity $U_0'$ imparted to the ink 11 inside the nozzle 28 is compared against the numerical calculation results for the initial velocity $U_0'$ imparted to the ink 11 inside the nozzle 28:

for the case in which ν is 100 $mm^2/s$, the logical value is 33.3 m/s whereas the numerical calculation result is 21.6 m/s; and for the case in which ν is 1000 $mm^2/s$, the logical value is 33.3 m/s whereas the numerical calculation result is 19.9 m/s.

SUMMARY

As described above, in the liquid jet discharge device 10 according to the present exemplary embodiment, the nozzle 28 that has a smaller cross-sectional area than the cross-sectional area of the pressure generation chamber 26 is formed in the bottom wall 22 of the container 12 (pressure generation chamber 26), and the contact angle θ of the inner peripheral face of the nozzle 28 with respect to the ink 11 is less than 90°. Accordingly, the upwardly concave meniscus (liquid surface) is formed in the nozzle 28. In this state, the container 12 is caused to impact the stopper 16 (an impulse force is imparted to the container 12), such that a long, fine tapered liquid jet MJ is discharged by speeding up from the vicinity of the axial center of the liquid surface LS.

In particular, in the liquid jet discharge device 10, the pressure generation chamber 26 that has the first length $l_t$ that is longer than the second length $l_m$ ($l_t > l_m$) and the cross-sectional area (internal diameter D) that is larger than the cross-sectional area (internal diameter d) of the nozzle 28 (D>d) is provided inside the container 12 above the nozzle 28. This enables the initial velocity $U_0'$ of the ink 11 inside the nozzle 28 to be sped up relative to the initial velocity $U_0$ of the ink 11 inside the pressure generation chamber 26 at the time of imparting the impulse force to the container 12. As a result, the discharge velocity of the liquid jet MJ discharged from inside the nozzle 28 can also be increased in comparison to a liquid jet discharge device provided with only a nozzle (not including a pressure generation chamber).

In particular, by regulating the ratio ($l_t/l_m$) of the axial direction length (first length) $l_t$ of the pressure generation chamber 26 relative to the axial direction length (second length) $l_m$ of the nozzle 28, the velocity increase ratio of the initial velocity $U_0'$ of the ink 11 inside the nozzle 28 relative to the initial velocity $U_0$ of the ink 11 inside the pressure generation chamber 26 can be simply regulated. Namely, the jet velocity $V_{jet}$ of the liquid jet MJ can be simply regulated.

For example, by increasing the ratio of the first length $l_t$ relative to the second length $l_m$ ($l_t/l_m$), the initial velocity $U_0'$ of the ink 11 inside the nozzle 28 can be sped up relative to the initial velocity $U_0$ of the ink 11 inside the pressure generation chamber 26 when the impulse force is imparted to the container 12. The discharge velocity of the liquid jet MJ discharged from inside the nozzle 28 can also be increased as a result. This enables ink 11 with a high viscosity to be discharged.

Namely, discharge of high viscosity pigment inks that have hitherto not been compatible with existing ink jet printers is enabled. Moreover, since the liquid jet MJ discharged from the nozzle 28 by imparting the impulse force to the container 12 is long and fine, at about one fifth of the internal diameter of the nozzle 28, fine printing on the paper 42 is enabled.

Moreover, since the velocity increase ratio of the initial velocity $U_0'$ of the ink 11 inside the nozzle 28 relative to the initial velocity $U_0$ of the ink 11 inside the pressure generation chamber 26 is determined by the ratio of the first length $l_t$ to the second length $l_m$, the velocity increase ratio can be simply regulated by changing the length of the pressure generation chamber 26 (container 12).

In other words, even if the axial direction length (second length) $l_m$ of the nozzle 28 is short, the velocity increase ratio can be simply increased. Accordingly, in the liquid jet discharge device 10, the axial direction length (second length) $l_m$ of the nozzle 28 can be set short. Thus, even in cases in which high viscosity ink 11 is discharged from the nozzle 28, the ink 11 is prevented or suppressed from adhering to the inner peripheral face of the nozzle 28 and causing clogging of the nozzle 28 as a result of slight misalignment in the discharge direction of the liquid jet MJ. Moreover, since the long and fine liquid jet MJ is discharged from the central portion of the liquid surface LS, clogging of the ink 11 at the liquid surface LS and the like can be suppressed. Namely, in the liquid jet discharge device 10, even in cases in which high viscosity ink 11 is discharged, the ink 11 can be prevented or suppressed from adhering to the inner peripheral face of the nozzle 28 and causing clogging of the nozzle 28.

Moreover, since the axial direction length (second length) $l_m$ of the nozzle 28 can be made short, a short distance from the discharge position (liquid surface LS) of the liquid jet MJ to the landing position (paper 42) is sufficient, enabling the landing precision of the ink 11 to be secured even if the manufacturing precision during manufacture of the container is not especially strict.

However, if the second length $l_m$ becomes too short, the ink 11 can no longer form a proper meniscus in the nozzle 28. Therefore, the second length $l_m$ is preferably at least half the internal diameter device of the nozzle 28 ($l_m$>d/2). In other words, by setting the second length $l_m$ to at least half the internal diameter d of the nozzle 28 ($l_m$>d/2), a well-formed upwardly concave meniscus can be formed in the nozzle 28 as long as the contact angle θ of the ink 11 with respect to the inner peripheral face of the nozzle 28 is less than 90°.

Moreover in the liquid jet discharge device 10, since the nozzle 28 and the pressure generation chamber 26 that has a larger cross-sectional area than the nozzle 28 are formed contiguous to one another in the container 12, it is sufficient to impart an impulse force to the container 12 using the moving mechanism 14 and the stopper 16. This enables the liquid jet discharge device 10 to be configured with a simple structure.

Since the upper end of the nozzle 28 is aligned with the bottom face 22A of the pressure generation chamber 26, pressure loss in the ink 11 when the ink 11 in the pressure generation chamber 26 flows into the nozzle 28 from the bottom face 22A side can be suppressed in comparison to cases in which a protrusion is formed on the bottom face 22A, thus enabling the discharge velocity of the liquid jet MJ to be further increased.

In particular, since the upper end of the nozzle 28 is positioned at the center of the bottom face 22A, pressure loss when the ink 11 inside the pressure generation chamber 26 flows into the nozzle 28 can be suppressed, thus enabling the discharge velocity of the liquid jet MJ to be further increased.

Moreover, the position of the liquid surface of the ink 11 inside the replenishment tank 44 of the replenishment device 18 is maintained higher than the bottom face 22A of the container 12, enabling a good supply of the ink 11 to the pressure generation chamber 26 due to the head pressure and the surface tension action of the ink 11. Namely, the ink 11 can be supplied from the replenishment tank 44 to the pressure generation chamber 26 without using a mechanical action.

This enables the liquid jet discharge device 10 to continuously discharge even high viscosity ink 11 onto the paper 42.

Variations

Figure 11:
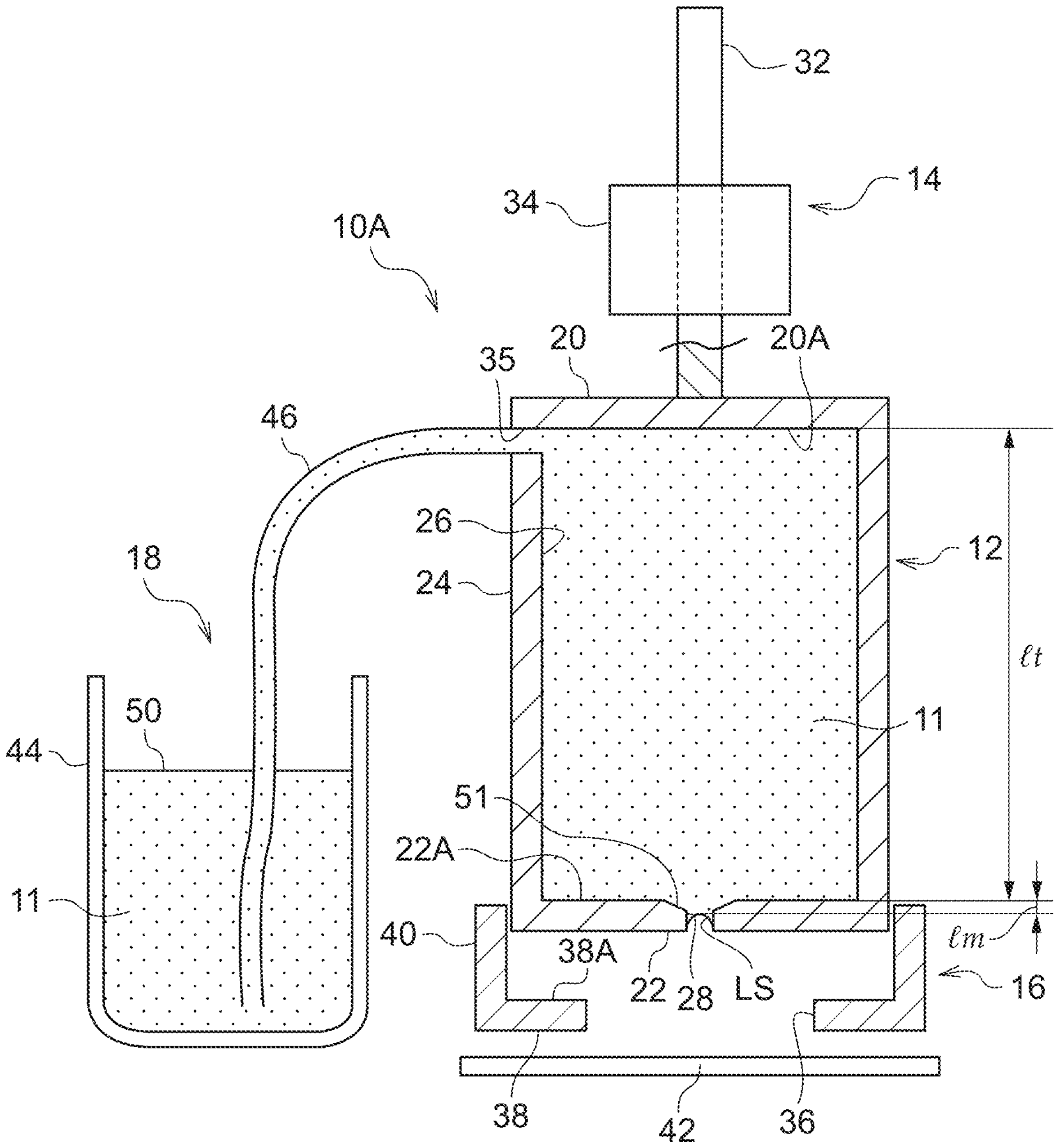
FIG. 11 is a schematic configuration diagram of a variation on a liquid jet discharge device according to the first exemplary embodiment.

FIG. 11 illustrates configuration of a liquid jet discharge device 10A as a possible variation on the liquid jet discharge device 10 of the present exemplary embodiment.

In the liquid jet discharge device 10A, a tapered face 51 inclined toward the bottom face 22A is provided at a pressure generation chamber-side end portion of the nozzle 28.

Forming the nozzle 28 in this manner enables pressure loss in the ink 11 flowing from the pressure generation chamber 26 into the nozzle 28 to be further suppressed, thus enabling the discharge velocity of the liquid jet MJ to be further increased.

Figure 12:
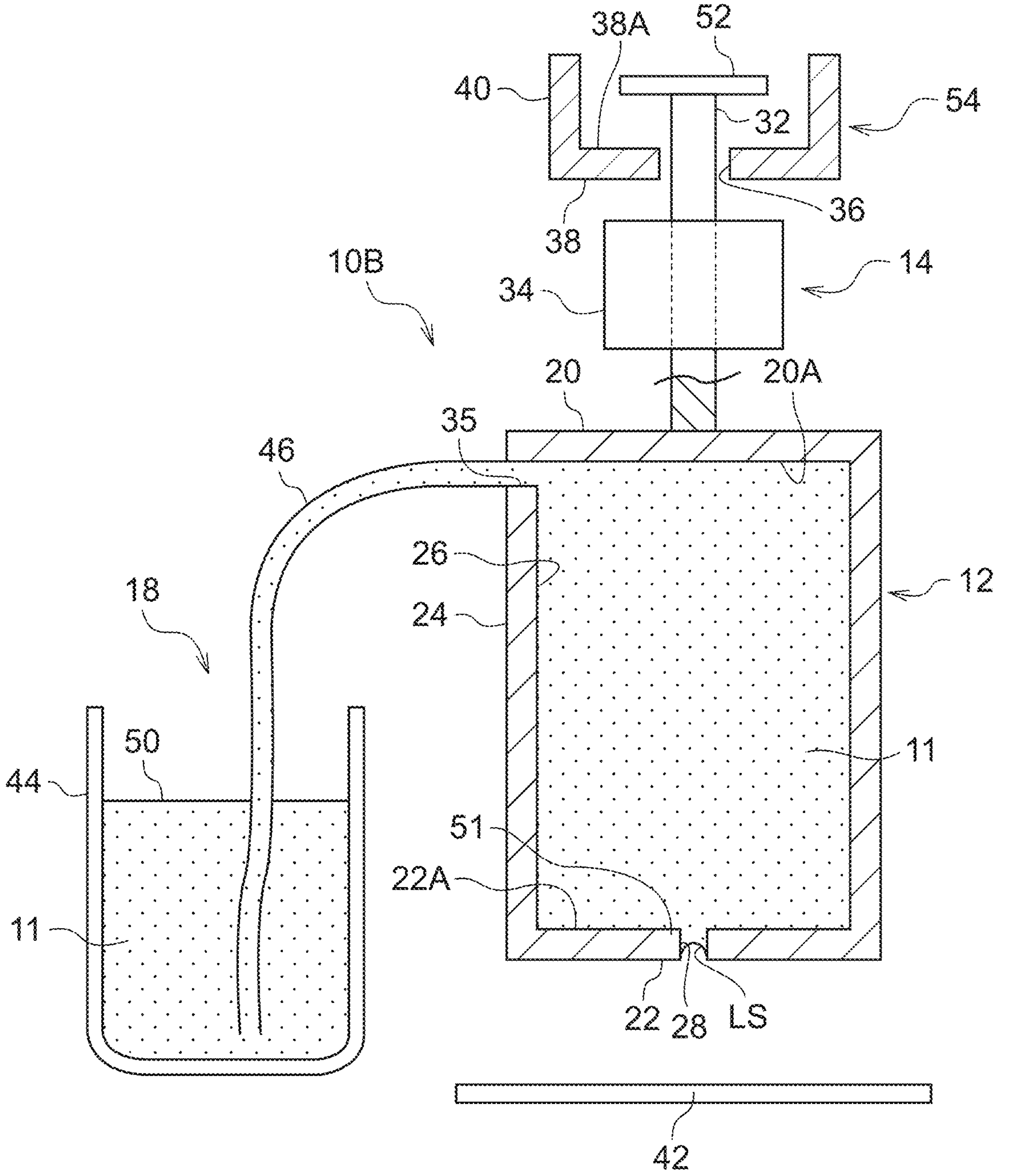
FIG. 12 is a schematic configuration diagram of another variation on a liquid jet discharge device according to the first exemplary embodiment.

FIG. 12 illustrates configuration of a liquid jet discharge device 10B as another possible variation.

In the liquid jet discharge device 10B, a circular plate shaped anchor plate 52 is provided to an upper end portion of the rod 32. Moreover, a stopper 54 substantially similar to that in the liquid jet discharge device 10, through which the rod 32 can be inserted, is provided between the anchor plate 52 of the rod 32 and the solenoid 34. Since the shape of the stopper 54 is similar to that of the stopper 16 of the first exemplary embodiment with the exception of size, the same reference numerals are allocated, and detailed explanation thereof is omitted.

In the liquid jet discharge device 10B, the rod 32 is moved downward by driving the solenoid 34, and the anchor plate 52 provided to the upper end of the rod 32 impacts the abutting face 38A of the stopper 54 so as to impart an impulse force to the container 12. The liquid jet MJ is discharged from the liquid surface LS in the nozzle 28 as a result.

In the liquid jet discharge device 10B, the stopper 54 is relocated at the upper side of the container 12 in this manner, such that the size of the stopper 54 can be reduced, and a more straightforward configuration can be achieved in which no other members are interposed between the nozzle 28 and the paper 42.

Second Exemplary Embodiment

Figure 13:
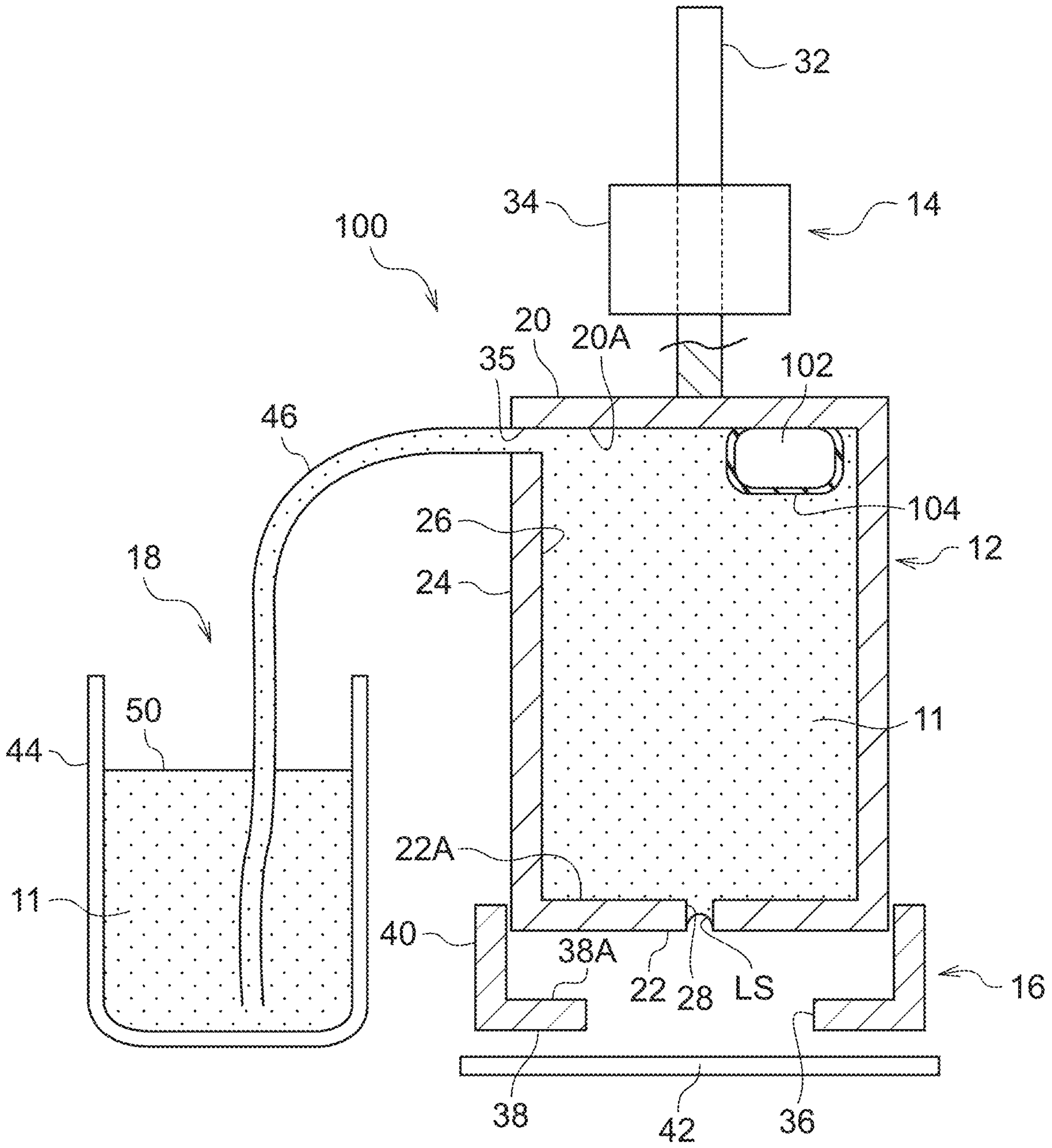
FIG. 13 is a schematic configuration diagram of a liquid jet discharge device according to a second exemplary embodiment.

Explanation follows regarding a liquid jet discharge device according to a second exemplary embodiment of the present disclosure, with reference to FIG. 13. The same reference numerals are appended to configuration elements similar to those of the first exemplary embodiment, and description thereof will be omitted. Note that only points differing from the first exemplary embodiment will be described.

As illustrated in FIG. 13, in a liquid jet discharge device 100, a flexible and elastic bag 104 inflated with air 102 is inserted inside the pressure generation chamber 26 filled with the ink 11F.

In the liquid jet discharge device 100, the solenoid 34 is driven to lower the rod 32 at a predetermined speed. As a result, the container 12 attached to the rod 32 impacts the stopper 16 at the predetermined speed. The impulse force is imparted to the container 12 due to this impact. Accordingly, the liquid surface LS that was formed with a concave surface profile due to the contact angle θ of the ink 11 being less than 90° adopts a horizontal surface profile inside the nozzle 28, and the liquid jet MJ that is finer than the nozzle 28 is ejected (discharged) from a central portion of the liquid surface LS.

When this occurs, (the air 102 inside) the bag 104 disposed inside the pressure generation chamber 26 expands due to the action of the impulse force with respect to the container 12, promoting movement of the ink 11 from the pressure generation chamber 26 to the nozzle 28.

In this manner, in the liquid jet discharge device 100, the bag 104 inflated with the air 102 is inserted into the ink 11 in the pressure generation chamber 26, and the expansion of the bag 104 when the impulse force is imparted enables the ink 11 to be reliably supplied into the nozzle 28 against viscosity loss in the pressure generation chamber 26, even when employing high viscosity ink 11.

Namely, a liquid jet can be reliably discharged from the nozzle 28 even when employing a high viscosity liquid.

Note that since it is sufficient that the bag 104 be capable of expanding when imparted with impulse force, the inside of the bag 104 may be filled with a gas other than air, or may be filled with a gel or the like that is capable of expanding when imparted with impulse force. Alternatively, the air 102 may be injected directly into the ink 11 in the pressure generation chamber 26 in the form of bubbles without employing the bag 104.

Third Exemplary Embodiment

Figure 14:
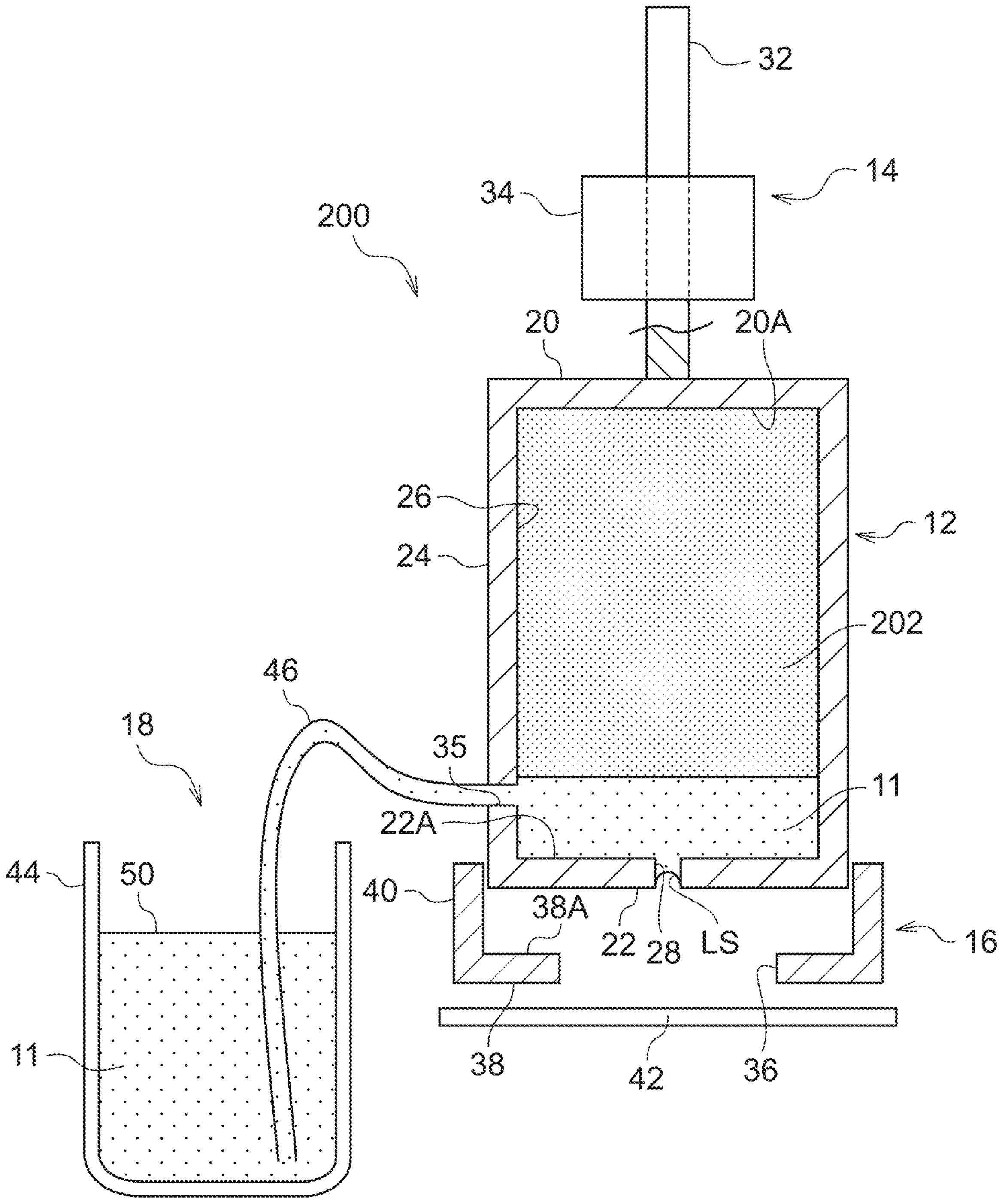
FIG. 14 is a schematic configuration diagram of a liquid jet discharge device according to a third exemplary embodiment.

Explanation follows regarding a liquid jet discharge device according to a third exemplary embodiment of the present disclosure, with reference to FIG. 14. The same reference numerals are appended to configuration elements similar to those of the first exemplary embodiment, and description thereof will be omitted. Note that only points differing from the first exemplary embodiment will be described.

As illustrated in FIG. 14, in a liquid jet discharge device 200, the ink 11 to be discharged from the nozzle 28 as the liquid jet MJ is housed on the bottom face 22A side inside the pressure generation chamber 26, and gelatin 202 is housed on the upper face 20A side inside the pressure generation chamber 26. The gelatin 202 corresponds to a "pressure generation medium".

Specifically, the gelatin 202 is poured inside the container 12 (pressure generation chamber 26) taking care not to block the nozzle 28 or the opening 35 with the gelatin 202, and the pressure inside the container 12 is raised to solidify the gelatin 202. The ink 11 is then supplied into the pressure generation chamber 26 and the nozzle 28 from the replenishment device 18.

Note that the gelatin 202 employed has a water content of 95% by mass.

The replenishment tube 46 of the replenishment device 18 is in communication with the opening 35 provided in an ink-placement region of the peripheral wall 24 configuring the pressure generation chamber 26.

Moreover, as illustrated in FIG. 14, in the present exemplary embodiment, the liquid surface 50 of the ink 11 held in the replenishment tank 44 of the replenishment device 18 is at the same height as or lower than the bottom face 22A of the pressure generation chamber 26.

Explanation follows regarding operation of the liquid jet discharge device 200.

The liquid jet discharge device 200 is, similarly to the liquid jet discharge device 10 according to the first exemplary embodiment, capable of discharging a long and fine liquid jet MJ at a high velocity increase ratio β from the liquid surface LS inside the nozzle 28.

In particular, in the liquid jet discharge device 200, the water content of the gelatin 202 housed inside the container 12 is 95%, and so there is a small difference between the acoustic impedance of the gelatin 202 and the acoustic impedance of the ink 11. Thus, a fall in the energy transmission rate at the interface between the gelatin 202 inside the container 12 and the ink 11 inside the nozzle 28 is suppressed, enabling good discharge of the liquid jet MJ.

Note that although the gelatin 202 employed most preferably has the same acoustic impedance as that of the ink 11, there may be a slight difference thereto. Confirmation has been made that the liquid jet MJ is discharged from the liquid jet discharge device 200 at least for gelatin 202 with an acoustic impedance up to about 1.5 times the acoustic impedance of the ink 11.

Moreover, in the liquid jet discharge device 200, since the gelatin 202 is housed at the upper portion side of the container 12 (pressure generation chamber 26), it is sufficient for the ink 11 to be housed at a location in communication with the nozzle 28 on the bottom face 22A side of the pressure generation chamber 26 that is in communication with the nozzle 28 (a location where the gelatin 202 is not present). Namely, the amount of ink 11 required to discharge the liquid jet MJ can be suppressed in this manner. In particular, suppressing the amount of ink 11 used is especially advantageous in cases in which an expensive ink 11 or the like is being discharged.

In particular, in cases in which the first length It is increased in order to increase the velocity increase ratio of the liquid jet discharge device 200, increasing a region where the gelatin 202 is housed is advantageous since the amount of ink 11 used does not increase.

Moreover, when replacing the ink 11 being used in the liquid jet discharge device 200, it is sufficient to drain the ink 11 from inside the pressure generation chamber 26 and the nozzle 28 and then supply a replacement liquid into the region of the pressure generation chamber 26 where the gelatin 202 is not housed and into the nozzle 28. Namely, this has the advantage of suppressing the amount of replaced liquid, since there is no need to replace the gelatin 202 housed inside the container 12.

Since the gelatin 202 does not mix or chemically react with the ink 11, there is no concern regarding a reduction in the quality of the liquid jet MJ (ink 11).

Note that although explanation has been given regarding an example in which the gelatin 202 is housed in the container 12 in the present exemplary embodiment, there is no limitation thereto. Another solid (non-fluid substance) that has an acoustic impedance meeting the above conditions relating to the acoustic impedance of the ink 11 may be applied in the present exemplary embodiment. For example, polydimethylsiloxane (PDMS) or the like may be considered.

Although the liquid surface 50 of the ink 11 held in the replenishment tank 44 of the replenishment device 18 is at the same height as or lower than the bottom face 22A of the pressure generation chamber 26 in the present exemplary embodiment as illustrated in FIG. 14, the ink 11 may be supplied to the pressure generation chamber 26 using only the surface tension action of the ink 11.

Note that high viscosity ink 11 may also be applied in the liquid jet discharge device 200. In such cases, similarly to in the first exemplary embodiment, the liquid surface 50 of the ink 11 in the replenishment tank 44 should be at the same height as or higher than the bottom face 22A.

Variations

Figure 15:
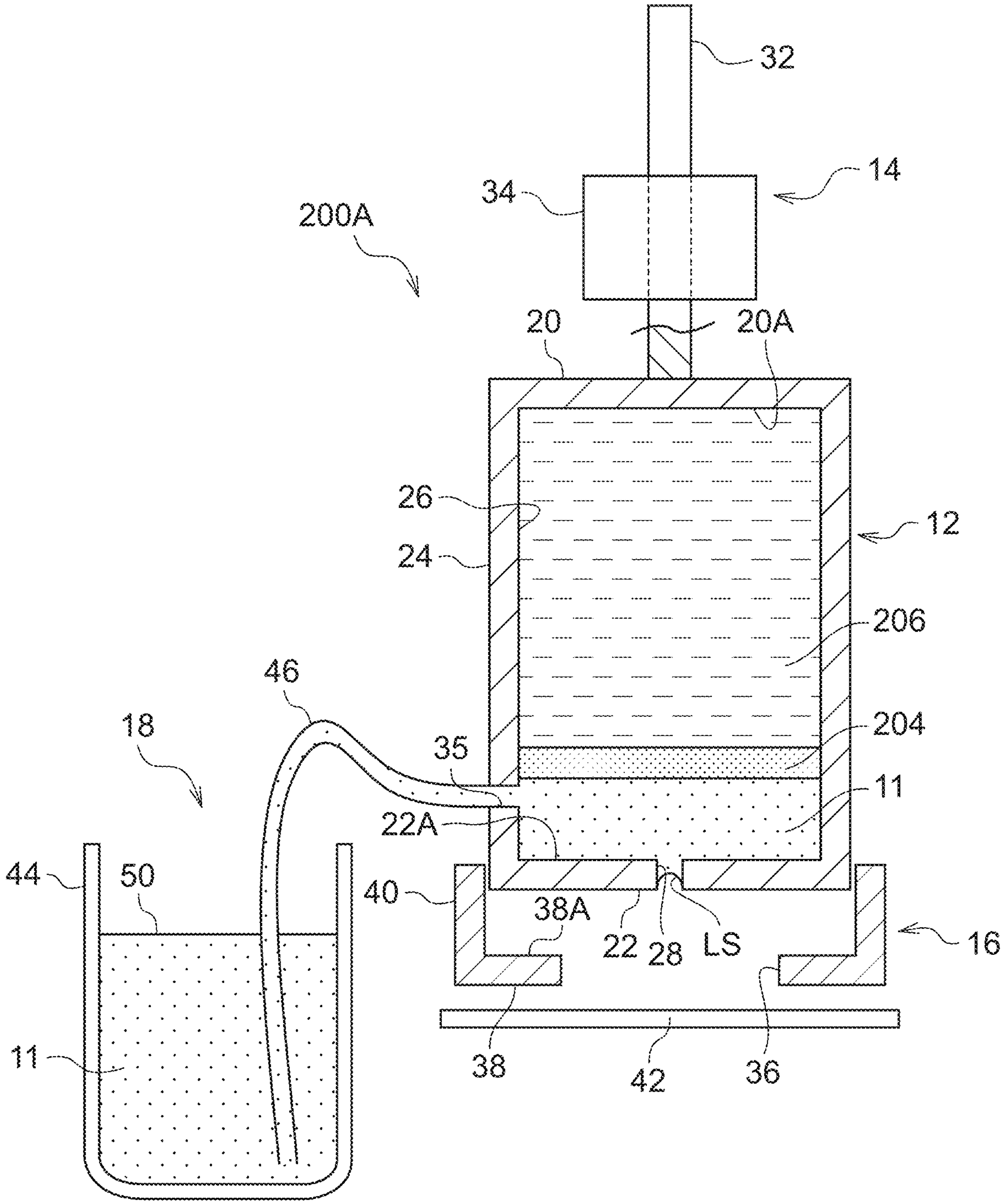
FIG. 15 is a schematic configuration diagram of a variation on a liquid jet discharge device according to the third exemplary embodiment.

Explanation follows regarding a liquid jet discharge device 200A as a variation on the liquid jet discharge device 200, with reference to FIG. 15. Note that the liquid jet discharge device 200A differs to the liquid jet discharge device 200 only in the placement of the liquid inside the pressure generation chamber 26, and explanation follows regarding this section only. In the liquid jet discharge device 200A, configuration elements equivalent to those of the liquid jet discharge device 200 are allocated the same reference numerals, and detailed explanation thereof is omitted In the liquid jet discharge device 200A, a film 204 configured from gelatin with a water content of 95% is placed at a lower end (nozzle-side end portion) of the portion where the gelatin 202 is placed in the pressure generation chamber 26 of the liquid jet discharge device 200. A liquid 206 that is different to the ink 11, for example water, is housed on the upper face 20A side of the film 204.

Configuring the liquid jet discharge device 200A in this manner enables a liquid jet discharge device MJ to be discharged with a high velocity increase ratio.

Since the pressure generation chamber 26 is partially filled with the liquid 206 that is different to the ink 11, and the film 204 partitions the ink 11 from the liquid 206, the ink 11 and the liquid 206 are prevented from mixing or chemically reacting with each other (which would cause the quality of the ink 11 to suffer). Moreover, the amount of the ink 11 employed in the pressure generation chamber 26 can be suppressed.

Providing the film 204 that is configured from gelatin with a water content of 95% results in a small difference in acoustic impedance between the film 204, the ink 11, and the liquid 206. Accordingly, a fall in the energy transmission rate at the interface between the liquid 206 that is different to the ink 11 and the film 204, and at the interface between the film 204 and the ink 11, when impulse force is imparted is suppressed, enabling good discharge of the liquid jet MJ.

Reference Example

Figure 16:
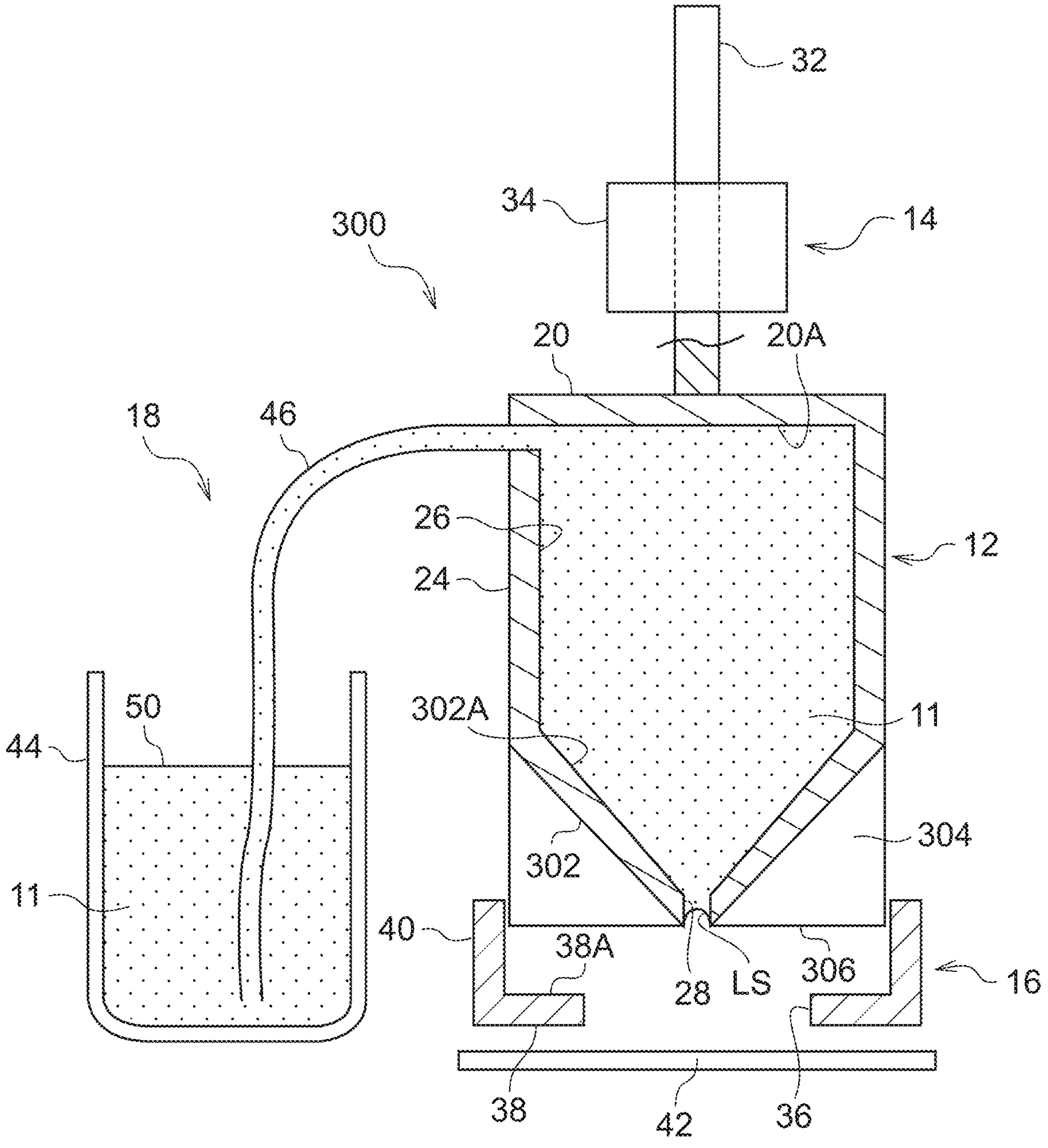
FIG. 16 is a schematic configuration diagram of a liquid jet discharge device according to a reference example.

Explanation follows regarding a liquid jet discharge device according to a reference example, with reference to FIG. 16. The same reference numerals are appended to configuration elements similar to those of the first exemplary embodiment, and description thereof will be omitted. Note that the only difference to the first exemplary embodiment is the shape of the container 12, and so explanation follows regarding this section only.

As illustrated in FIG. 16, the container 12 is configured in a circular cylindrical shape on the upper wall 20 side, and is configured in a circular conical shape with decreasing diameter on progression from an intermediate location toward the nozzle 28. Namely, the nozzle 28 side of the container 12 configures a circular conical shaped circular conical portion 302, and an inner peripheral face thereof configures a tapered face 302A configuring the pressure generation chamber 26.

The circular conical portion 302 of the container 12 is formed with plural ribs 304 jutting toward the radial direction outside at predetermined intervals around the circumferential direction. Bottom faces 306 of the ribs 304 extend in radial directions, and the bottom faces 306 abut the abutting face 38A when the container 12 impacts the stopper 16.

In a liquid jet discharge device 300 configured in this manner, the ribs 304 (bottom faces 306) of the container 12 impact the abutting face 38A of the stopper 16 when driven by the solenoid 34 so as to impart an impulse force to the container 12, thus causing the liquid jet MJ to be discharged from the nozzle 28.

Note that from the perspective of increasing the velocity increase ratio, the liquid jet discharge device 300 configured in this manner is at a disadvantage compared to the liquid jet discharge device 10 due to the pressure generation chamber 26 including the tapered face 302A.

Other

Although explanation has been given regarding the liquid jet discharge devices according to the first to the third exemplary embodiments, the present disclosure is not limited thereto. Namely, as long an impulse force can be imparted to the container 12 by a knocking action, configuration is not limited to the moving mechanism 14 and the stopper 16. For example, configuration may be made in which impulse force is imparted from a side of the peripheral wall 24 of the container 12.

Although the discharge direction of the liquid jet MJ (open end of the nozzle 28) is directed vertically downward in the first to the third exemplary embodiments, there is no limitation thereto. For example, the discharge direction may be horizontal or vertically upward. Note that in such cases, the internal diameter d of the nozzle 28 needs to be sufficiently small, and the liquid surface LS needs to be maintained with a concave surface profile recessed toward the upper wall 20 side of the container 12 by surface tension action. Replenishment of the ink 11 from the replenishment device 18 to the pressure generation chamber 26 may, for example, be performed by applying pressure to the ink 11 in the replenishment tank 44.

Although the nozzle 28 and the pressure generation chamber 26 have circular cross-sections in the first to the third exemplary embodiments, the present disclosure is not limited thereto.

Although the upper end of the nozzle 28 opens onto the center of the bottom face 22A of the pressure generation chamber 26 in the first to the third exemplary embodiments, the present disclosure is not limited thereto. For example, the upper end of the nozzle 28 may be positioned at a radial direction outside end portion of the bottom face 22A.

Although a single nozzle 28 is provided to the container 12 (pressure generation chamber 26) in the first to the third exemplary embodiments, plural of the nozzles 28 may be provided thereto. For example, three of the nozzles 28 may be provided to the bottom wall 22 of the pressure generation chamber 26.

Although the pressure generation chamber 26 of the container 12 is closed and internally filled with the ink 11 in the first to the third exemplary embodiments, the pressure generation chamber 26 may be open at an upper portion.

Note that in such cases, the length from the bottom face 22A of the pressure generation chamber 26 to the liquid surface at the upper portion corresponds to the first length $l_r$.

Moreover, although one end portion 281 of the nozzle 28 opens onto the bottom face 22A of the pressure generation chamber 26 in the first to the third exemplary embodiments, the one end portion of the nozzle 28 may project into the pressure generation chamber 26. In such cases, the second length $l_m$ is the axial direction length from the one end portion of the nozzle 28 to the liquid surface LS, and the first length It is the axial direction length from the upper face 20A to the bottom face 22A of the pressure generation chamber 26.

Moreover, although cases in which the ink 11 is employed as the liquid to be discharged are described in the first to the third exemplary embodiments, the present disclosure is not limited thereto. Other liquids may also be applied. For example, since the liquid jet discharge devices of the first to the third exemplary embodiments are capable of discharging the liquid jet MJ at high velocity and also capable of controlling the jet velocity $V_{jet}$, these liquid jet discharge devices would conceivably be capable of controlling subcutaneous or intra-muscle medication penetration positions and be applied to a needle-free injection apparatus.

Although the liquid surface 50 of the ink 11 in the replenishment tank 44 is higher than the position of the bottom face 22A of the pressure generation chamber 26 when the liquid jet discharge device is in operation in the first and the second exemplary embodiments, the liquid surface 50 of the ink 11 in the replenishment tank 44 may be lowered to the meniscus formation position in the nozzle 28 after operation has ended.

Moreover, although the liquid surface 50 of the ink 11 held in the replenishment tank 44 of the replenishment device 18 is at the height of the bottom face 22A of the pressure generation chamber 26 or lower, and the ink 11 can be supplied to the pressure generation chamber 26 using the surface tension of the ink 11 in the third exemplary embodiment, this configuration is not limited to the third exemplary embodiment, and may also be applied in the first and second exemplary embodiments and so on.

The disclosure of Japanese Patent Application No. 2018-119345, filed on Jun. 22, 2018, is incorporated in its entirety by reference herein.

Supplement

A first aspect of the present disclosure provides a liquid microjet high speed discharge device including an ejection section, a pressure generation section, and an impulse force impartation means. The ejection section is open at both end portions and internally houses a liquid such that a contact angle between the liquid and at least an inner face of the ejection section is less than 90°. The pressure generation section is in communication with one end portion of the ejection section, has a cross-sectional area larger than a cross-sectional area of the ejection section, has a length in a discharge direction of a liquid microjet longer than a length in the discharge direction from the one end portion of the ejection section to a surface of the liquid, and houses the liquid at least at a bottom face side onto which the one end portion opens. The impulse force impartation means is configured to impart an impulse force to the pressure generation section.

A second aspect of the present disclosure provides the liquid microjet high speed discharge device of the first aspect of the present disclosure, wherein the one end portion of the ejection section is aligned with the bottom face.

A third aspect of the present disclosure provides the liquid microjet high speed discharge device of the second aspect of the present disclosure, wherein a tapered face inclined toward the bottom face is formed at the one end portion side of the ejection section.

A fourth aspect of the present disclosure provides the liquid microjet high speed discharge device of any one of the first aspect to the third aspect of the present disclosure, wherein the one end portion of the ejection section opens onto a center of the bottom face of the pressure generation section.

A fifth aspect of the present disclosure provides the liquid microjet high speed discharge device of any one of the first aspect to the fourth aspect of the present disclosure, wherein the liquid is housed on the bottom face side of the pressure generation section, and a pressure generation medium having an acoustic impedance of from 1 to 1.5 times an acoustic impedance of the liquid is housed on an opposite side to the bottom face side without mixing or chemically reacting with the liquid.

A sixth aspect of the present disclosure provides the liquid microjet high speed discharge device of any one of the first aspect to the fifth aspect of the present disclosure, further including a replenishment device. The replenishment device includes a replenishment section inside which the liquid is held, and a liquid supply path that is in communication with a portion of the replenishment section holding the liquid and with a portion of the pressure generation section holding the liquid.

A seventh aspect of the present disclosure provides the liquid microjet high speed discharge device of the sixth aspect, wherein another end portion 282 of the ejection section opens downward in the liquid jet discharge device. The replenishment device is configured to supply the liquid to the pressure generation section by either an action of a head pressure of the liquid held in the replenishment section and an action of surface tension of the liquid, or by the action of the surface tension of the liquid alone.

The invention claimed is:

1. A liquid jet discharge device, comprising:

a nozzle having first and second end portions, the nozzle being open at both of the first and second end portions and internally housing a liquid such that a contact angle between the liquid and at least an inner face of the nozzle is less than 90°;

a container comprising a first wall and a second wall opposite the first wall, wherein the container is in communication with the nozzle and configured to house the liquid at least at the first wall, wherein the nozzle is formed in the first wall, wherein the first end portion of the nozzle is formed in a first surface of the first wall and the second end portion of the nozzle is formed in a second surface of the first wall such that the nozzle penetrates the first wall, the container comprising: a cross-sectional area larger than a cross-sectional area of the nozzle, wherein the container has a length in a discharge direction of a liquid jet that is longer than a length in the discharge direction from the first end portion of the nozzle to a surface of the liquid;

a moving mechanism and a stopper configured to impart an impulse force to the container; and a replenishment device that is configured to supply the liquid into the container, wherein the moving mechanism is configured to move the container in the discharge direction, and wherein the stopper is configured to be abutted by the container when moving in the discharge direction toward a discharge target so as to stop the container.

2. The liquid jet discharge device of claim 1, wherein the first end portion of the nozzle is aligned with the first surface of the first wall.

3. The liquid jet discharge device of claim 2, wherein a tapered face inclined toward a bottom face is formed at the first end of the nozzle.

4. The liquid jet discharge device of claim 1, wherein the first end portion of the nozzle is disposed in a center of a bottom face of the container.

5. The liquid jet discharge device of claim 1, wherein:

the liquid is housed at a bottom face side of the container; and a pressure generation medium having an acoustic impedance of from 1 to 1.5 times an acoustic impedance of the liquid is housed at an opposite side to the bottom face side without mixing or chemically reacting with the liquid.

6. The liquid jet discharge device of claim 1, wherein the replenishment device includes:

a replenishment section for housing the liquid; and a liquid supply path that is in communication with a portion of the replenishment section, and wherein a portion of the container holds the liquid.

7. The liquid jet discharge device of claim 6, wherein:

another end portion of the nozzle opens downward in the liquid jet discharge device; and the replenishment device is configured to supply the liquid to the container by either an action of a head pressure of the liquid held in the replenishment section and an action of surface tension of the liquid, or by the action of the surface tension of the liquid alone.

* * * * *